United States Patent
Tanaka

(10) Patent No.: US 11,599,318 B2
(45) Date of Patent: Mar. 7, 2023

(54) VERIFICATION APPARATUS, CONTROL METHOD THEREOF, PRINTING SYSTEM, AND STORAGE MEDIUM

(71) Applicant: CANON KABUSHIKI KAISHA, Tokyo (JP)

(72) Inventor: Nobuhiko Tanaka, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/592,020

(22) Filed: Feb. 3, 2022

(65) Prior Publication Data

US 2022/0253260 A1    Aug. 11, 2022

(30) Foreign Application Priority Data

Feb. 8, 2021    (JP) .............................. JP2021-018516

(51) Int. Cl.
*G06F 3/12*    (2006.01)

(52) U.S. Cl.
CPC .......... *G06F 3/1265* (2013.01); *G06F 3/1208* (2013.01); *G06F 3/1242* (2013.01); *G06F 3/1257* (2013.01); *G06F 3/1276* (2013.01)

(58) Field of Classification Search
CPC .................................................... G06F 3/1265

USPC ......................................................... 358/3.24
See application file for complete search history.

(56) References Cited

U.S. PATENT DOCUMENTS

2010/0033743 A1*    2/2010    Hirai ................... H04N 1/00002
                                                    358/1.9

FOREIGN PATENT DOCUMENTS

JP    2010042521 A    2/2010

* cited by examiner

*Primary Examiner* — Jacky X Zheng
(74) *Attorney, Agent, or Firm* — Rossi, Kimms & McDowell LLP

(57) ABSTRACT

A verification apparatus includes reads an image on a sheet conveyed using a plurality of imaging units configured to respectively perform reading in read regions different from each other in a predetermined direction orthogonal to a conveyance direction of the sheet, the read regions respectively corresponding to adjacent imaging units partially overlapping with each other. The apparatus performs processing of changing a size, in the predetermined direction, of a larger one of a read image obtained by reading the image on the sheet by each of the plurality of imaging units, and a corresponding reference image, in accordance with a size of a smaller one, and performs verification by comparing the read image corresponding to each of the plurality of imaging units with the corresponding reference image, after the processing has been completed.

16 Claims, 11 Drawing Sheets

VERIFICATION APPARATUS, CONTROL METHOD THEREOF, PRINTING SYSTEM, AND STORAGE MEDIUM

BACKGROUND OF THE INVENTION

Field of the Invention

The present invention relates to a verification apparatus configured to perform verification on a sheet on which an image is printed, a control method thereof, a printing system, and a storage medium

Description of the Related Art

Printing systems have been known with which a printed sheet, having an image printed thereon using a printing apparatus and being conveyed, can be verified using a verification apparatus. The verification apparatus reads the image on the printed sheet being conveyed, and analyzes the read image thus obtained, to determine whether the printed sheet is normal. Such verification enables detection of a printed sheet with abnormality such as defective barcode or ruled line, missing image, printing failure, missing page, or color shift for example.

Japanese Patent Laid-Open No. 2010-42521 discloses an image forming apparatus that, upon determining that an image printed on a sheet is a defective image, performs processing of discharging the sheet to a discharge destination that is different from that for a sheet on which a normal image is printed. Through such processing, the sheet on which the defective image is printed can be prevented from mixing in the output products.

For the sake of cost reduction of the apparatus, an imaging unit (reading unit) that reads an image printed on a sheet being conveyed may be formed as a combination of a plurality of reading devices (cameras for example) that can read respective regions with a width smaller than that of a sheet of the largest size conveyable. When the verification apparatus uses such a plurality of reading devices to read an image on a sheet, conveyance misalignment of the sheet being conveyed leads to a change in regions on the sheet readable by the respective reading devices. As a result, the sizes of the read images corresponding to sheet portions obtained by the respective reading devices fail to match the size of a reference image for the verification. Thus, the sheet verification fails.

SUMMARY OF THE INVENTION

In view of the above, the present invention enables the verification on a sheet that is a verification target of a verification apparatus including a plurality of imaging units, even when conveyance misalignment of the sheet occurs.

According to one aspect of the present invention, there is provided a verification apparatus configured to perform verification on an image printed on a sheet, the verification apparatus comprising: a reading unit including a plurality of imaging units configured to respectively perform reading in read regions different from each other in a predetermined direction orthogonal to a conveyance direction of a sheet, the reading unit being configured to use the plurality of imaging units to read the image on the sheet conveyed, the read regions respectively corresponding to adjacent imaging units partially overlapping with each other; a change unit configured to perform processing of changing a size, in the predetermined direction, of a larger one of a read image obtained by reading the image on the sheet by each of the plurality of imaging units, and a corresponding reference image, in accordance with a size of a smaller one; and a verification unit configured to perform verification by comparing the read image corresponding to each of the plurality of imaging units with the corresponding reference image, after the processing by the change unit has been completed.

According to another aspect of the present invention, there is provided a verification apparatus configured to perform verification on an image printed on a sheet, the verification apparatus comprising: a reading unit including a plurality of imaging units configured to respectively perform reading in read regions different from each other in a predetermined direction orthogonal to a conveyance direction of a sheet, the reading unit being configured to use the plurality of imaging units to read the image on the sheet conveyed, the read regions respectively corresponding to adjacent imaging units partially overlapping with each other; an identification unit configured to identify a size of one of a read image obtained by reading the image on the sheet by each of the plurality of imaging units, and a corresponding reference image, having a smaller size in the predetermined direction; and a verification unit configured to compare the read image corresponding to each of the plurality of imaging units and the corresponding reference image, about a region of the size identified by the identification unit in the predetermined direction, to verify the read image.

According to still another aspect of the present invention, there is provided a method of controlling a verification apparatus configured to perform verification on an image printed on a sheet, the method comprising: using a plurality of imaging units to read an image on a sheet conveyed, the plurality of imaging units being configured to respectively perform reading in read regions different from each other in a predetermined direction orthogonal to a conveyance direction of the sheet, the read regions respectively corresponding to adjacent imaging units partially overlapping with each other; performing processing of changing a size, in the predetermined direction, of a larger one of a read image obtained by reading the image on the sheet by each of the plurality of imaging units, and a corresponding reference image, in accordance with a size of a smaller one; and performing verification by comparing the read image corresponding to each of the plurality of imaging units with the corresponding reference image, after the processing been completed.

According to yet another aspect of the present invention, there is provided a non-transitory computer-readable storage medium storing a computer program for causing a computer to execute a method of controlling a verification apparatus configured to perform verification on an image printed on a sheet, the method comprising: using a plurality of imaging units to read an image on a sheet conveyed, the plurality of imaging units being configured to respectively perform reading in read regions different from each other in a predetermined direction orthogonal to a conveyance direction of the sheet, the read regions respectively corresponding to adjacent imaging units partially overlapping with each other; performing processing of changing a size, in the predetermined direction, of a larger one of a read image obtained by reading the image on the sheet by each of the plurality of imaging units, and a corresponding reference image, in accordance with a size of a smaller one; and performing verification by comparing the read image corresponding to each of the plurality of imaging units with the corresponding reference image, after the processing been completed.

Further features of the present invention will become apparent from the following description of exemplary embodiments (with reference to the attached drawings).

DESCRIPTION OF THE EMBODIMENTS

Figure 1:
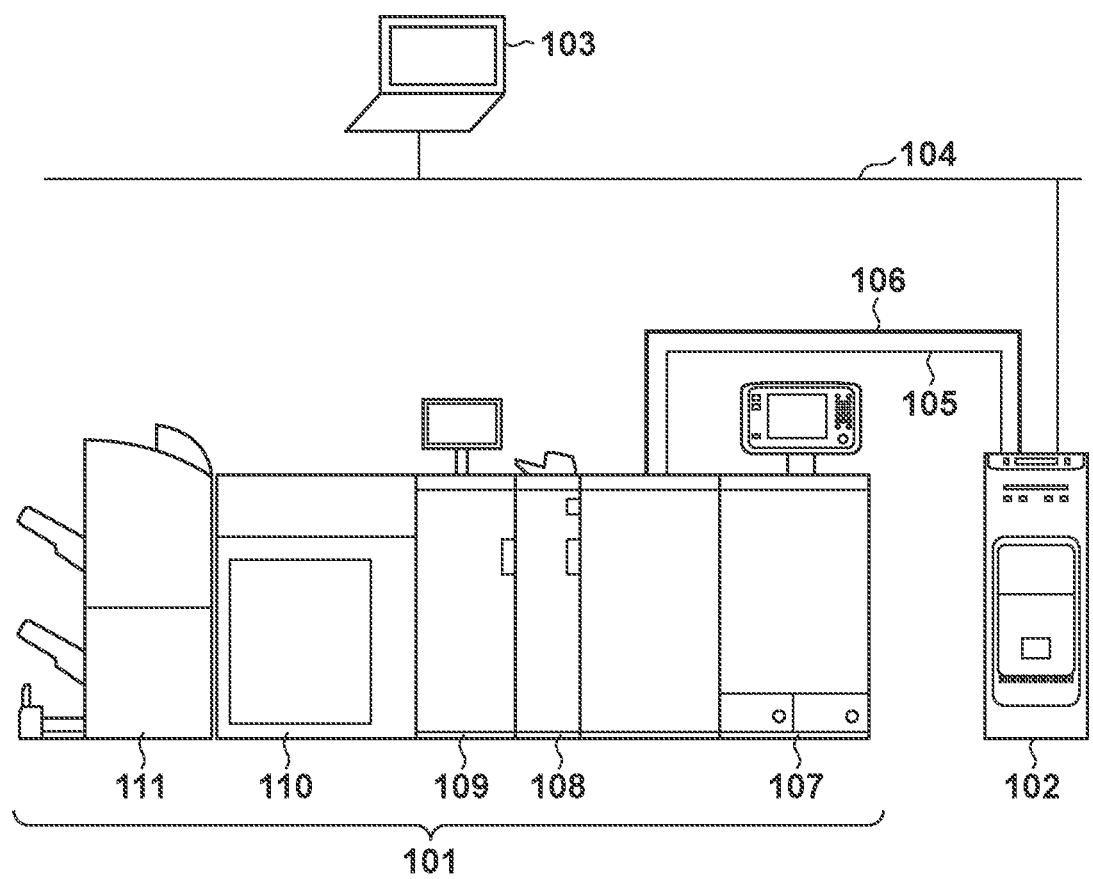
FIG. 1 is a diagram illustrating an example of a configuration of a network including a printing system.

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

First Embodiment

FIG. 1 is a diagram illustrating an example of a configuration of a network including a printing system according to a first embodiment. As illustrated in FIG. 1, a printing system 101 is connected with an external controller 102. The printing system 101 and the external controller 102 form an image processing system. The printing system 101 may be referred to as, for example, an image forming apparatus, a composite machine, or a multi-function peripheral (MFP). The printing system 101 and the external controller 102 are communicatively connected via an internal LAN 105 and a video cable 106. The external controller 102 is communicatively connected to a client PC 103 via an external LAN 104. The external controller 102 may be referred to as, for example, an image processing controller, digital front end (DFE), or a print server.

The client PC 103 can issue a print instruction to the external controller 102 via the external LAN 104. The client PC 103 has a printer driver installed therein. The printer driver has a function of converting print data into data in a print description language that is processable by the external controller 102. By operating the client PC 103, a user can issue a print instruction to the printing system 101 via the printer driver from various applications installed in the PC. The printer driver transmits print data to the external controller 102 based on the print instruction from the user. Upon receiving the print data from the client PC 103, the external controller 102 performs data analysis and rasterizing processing on the received print data, and issues the print instruction by inputting the processed print data to the printing system 101.

The printing system 101 includes a plurality of apparatuses having different functions, and is configured to be capable of executing various types of processing such as bookbinding processing. In the present embodiment, the printing system 101 includes a printing apparatus 107, an inserter 108, a verification apparatus 109, a large-capacity stacker 110, and a finisher 111. A sheet (paper) that has had an image printed thereon by the printing apparatus 107 and has been discharged from the printing apparatus 107 is conveyed in the apparatuses, that is, in the inserter 108, the verification apparatus 109, the large-capacity stacker 110, and the finisher 111 in this order. In the present embodiment, the printing system 101 is an example of an image forming apparatus, but the printing apparatus 107 included in the printing system 101 may be referred to as the image forming apparatus.

The printing apparatus 107 forms (prints) an image, using toner (developer), on the sheet fed and conveyed from a feeding unit disposed in a lower portion of the printing apparatus 107. The inserter 108 is an apparatus for inserting an insertion sheet into a series of sheet set conveyed from the printing apparatus 107. The verification apparatus 109 is an apparatus for verifying an image printed on a sheet. In the printing system 101, the verification apparatus 109, to which the sheet having the image printed thereon by the printing apparatus 107 is conveyed through a conveyance path, verifies the image printed on the sheet. More specifically, the verification apparatus 109 reads the image printed on the conveyed sheet, and compares the read image thus obtained with a reference image registered in advance to verify the image printed on the sheet (determine whether the image is normal). The large-capacity stacker 110 is an apparatus on which a large number of sheets can be stacked. The finisher 111 is an apparatus that can execute finishing processing, such as stapling processing, punching processing, or saddle stitch bookbinding processing, on the conveyed sheet. The sheet processed by the finisher 111 is discharged to a predetermined sheet discharge tray.

In the example configuration in FIG. 1, the external controller 102 is connected to the printing system 101, but the present embodiment can also be applied to a configuration different from this. For example, a configuration may be employed in which the printing system 101 is connected to the external LAN 104, so that the print data is transmitted from the client PC 103 to the printing system 101 without passing through the external controller 102. In this case, the printing system 101 executes data analysis and rasterizing on the print data.

<Printing System>

Figure 2:
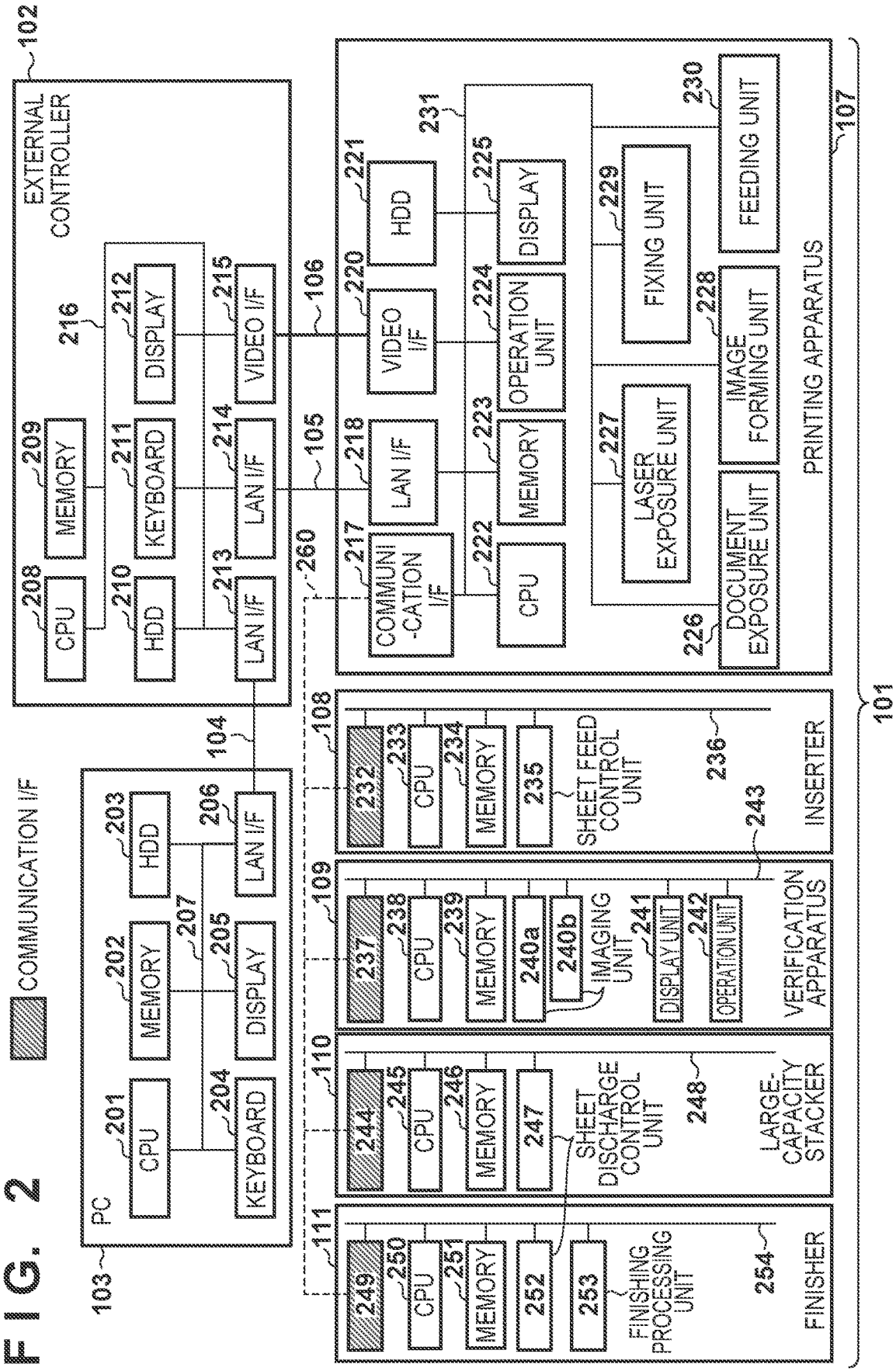
FIG. 2 is a block diagram illustrating a hardware configuration example of the printing system.

FIG. 2 is a block diagram illustrating a hardware configuration example of the printing system 101, the external controller 102, and the client PC 103. A configuration example of the printing system 101 will be described with reference to FIG. 2.

The printing apparatus 107 of the printing system 101 includes a communication interface (I/F) 217, a LAN I/F 218, a video I/F 220, an HDD 221, a CPU 222, a memory 223, an operation unit 224, and a display 225. The printing apparatus 107 further includes a document exposure unit 226, a laser exposure unit 227, an image forming unit 228, a fixing unit 229, and a feeding unit 230. These devices are connected to each other via a system bus 231.

The communication I/F 217 is connected to the inserter 108, the verification apparatus 109, the large-capacity stacker 110, and the finisher 111 via a communication cable 260. The CPU 222 performs communication via the communication I/F 217 for controlling each of the apparatuses. The LAN I/F 218 is connected to the external controller 102 via the internal LAN 105 and is used for communicating control data and the like. The video I/F 220 is connected to the external controller 102 via video cable 106 and is used for communicating data such as image data. The printing apparatus 107 (printing system 101) and the external controller 102 may be connected via the video cable 106 only, as long as the external controller 102 can control the operations of the printing system 101.

The HDD 221 stores various programs or data. The CPU 222 executes the program stored in HDD 221 to control the operations of the printing apparatus 107 as a whole. The memory 223 stores programs and data required for the CPU 222 to perform various types of processing. The memory 223 operates as a work area for the CPU 222. The operation unit 224 accepts input of various settings and an instruction for an operation from the user. The display 225 is used for displaying various types of information, such as setting information and processing status of print job.

The document exposure unit 226 reads the document when a copy function or a scanning function is used. The document is read such that a sheet is set by the user, and illuminated by an exposure lamp and then an image is captured by a CCD camera. In the print processing (image forming processing), the laser exposure unit 227 charges a photosensitive drum and exposes the photosensitive drum with a laser beam modulated depending on the image data, to form an electrostatic latent image on the photosensitive drum. The image forming unit 228 includes a developing unit that develops the electrostatic latent image formed on the photosensitive drum to form a toner image, a primary transfer unit that transfers the toner image from the photosensitive drum to an intermediate transfer belt, and a secondary transfer unit that transfers the toner image from the intermediate transfer belt to the sheet. The fixing unit 229 fixes the toner image on the sheet by applying heat and pressure to the toner image transferred to the sheet. The feeding unit 230 feeds a sheet that is a target of the image forming by the image forming unit 228, from a sheet deck (sheet cassette) to a conveyance path. The sheet feeding and conveyance operations are controlled using various rollers or sensors.

The inserter 108 includes a communication I/F 232, a CPU 233, a memory 234, and a sheet feed control unit 235. These devices are connected to each other via a system bus 236. The communication I/F 232 is connected to the printing apparatus 107 via the communication cable 260. The CPU 233 performs communications required for controlling the inserter 108, via the communication I/F 232. The CPU 233 controls the operation of the inserter 108 by executing a control program stored in the memory 234. The memory 234 stores the control program for the inserter 108. The sheet feed control unit 235 controls the various rollers and sensors in accordance with an instruction from the CPU 233, to control the feeding of the insertion sheet from the feeding unit of the inserter 108 and the conveyance of the sheet conveyed from the printing apparatus 107.

The verification apparatus 109 includes a communication I/F 237, a CPU 238, a memory 239, a display unit 241, and an operation unit 242. The verification apparatus 109 further includes, as a plurality of imaging units (reading units), imaging units 240a and 240b. These devices are connected to each other via a system bus 243. The communication I/F 237 is connected to the printing apparatus 107 via the communication cable 260. The CPU 238 performs communications required for controlling the verification apparatus 109 via the communication OF 237. The CPU 238 controls the operation of the verification apparatus 109 by executing a control program stored in the memory 239. The memory 239 stores the control program for the verification apparatus 109. The display unit 241 is used for displaying a verification result, a setting screen, and the like. The operation unit 242 is operated by the user and receives various instructions from the user (such as, for example, a change in settings of the verification apparatus 109 and an instruction for registering a reference image).

In accordance with an instruction from the CPU 238, the imaging units 240a and 240b capture an image of the sheet conveyed (to an image capturing position of the imaging units) to read the image printed on the sheet. The CPU 238 performs reference image registration processing by performing processing of storing (registering) the image, captured by the imaging units 240a and 240b, in the memory 239 as a reference image. In the reference image registration processing, an image obtained by processing of superimposing or averaging a plurality of read images for each page of a printed sheet, may be registered as the reference image. Thus, variation components, included in the printed sheet, smaller (minor) than variation components corresponding to the verification precision can be reduced. In addition, the CPU 238 performs printed sheet verification processing by comparing the image captured by the imaging units 240a and 240b with the reference image stored in the memory 239, and verifying the image printed on the sheet based on a result of the comparison. In the verification processing, whether the image printed on the sheet is normal (whether the image has a defect) is determined.

The verification apparatus 109 reads the image on the sheet conveyed, by capturing the image of the sheet conveyed using the plurality of imaging units (the imaging units 240a and 240b). The plurality of imaging units are arranged to respectively perform reading on different read regions in a predetermined direction (width direction) orthogonal to the conveyance direction of the sheet, and thus are arranged to respectively capture images of different regions on the sheet conveyed. Furthermore, the plurality of imaging units are arranged in such a manner that the read regions corresponding adjacent imaging units (the imaging units 240a and 240b) partially overlap with each other as described later. While an example where the verification apparatus 109 includes the two imaging units 240a and 240b is described in the present embodiment, the verification apparatus 109 may include three or more imaging units.

Specifically, the imaging units 240a and 240b of the verification apparatus 109 of the present embodiment capture images of respective regions, on the sheet conveyed, on one edge side and the other edge side in the width direction orthogonal to the conveyance direction of the sheet. As an example, in the following description, the imaging unit 240a is arranged to capture an image of a region on the left side relative to the conveyance direction of the sheet, and the imaging unit 240b is arranged to capture an image of a region on the right side relative to the conveyance direction of the sheet.

The large-capacity stacker 110 includes a communication I/F 244, a CPU 245, a memory 246, and a sheet discharge control unit 247. These devices are connected to each other via a system bus 248. The communication I/F 244 is connected to the printing apparatus 107 via the communication cable 260. The CPU 245 performs communications required for controlling the large-capacity stacker 110 via the communication I/F 244. The CPU 245 controls the operation of the large-capacity stacker 110 by executing a control program stored in the memory 246. The memory 246 stores the control program for the large-capacity stacker 110. In accordance with an instruction from the CPU 245, the sheet discharge control unit 247 performs control to discharge the sheet, conveyed on the conveyance path, to a stack tray, discharge the sheet to an escape tray, or convey the sheet to the finisher 111 connected on the downstream side in the conveyance direction of the sheet.

The finisher 111 includes a communication I/F 249, a CPU 250, a memory 251, a sheet discharge control unit 252, and a finishing processing unit 253. These devices are connected to each other via a system bus 254. The communication I/F 249 is connected to the printing apparatus 107 via the communication cable 260. The CPU 250 performs communications required for controlling the finisher 111 via the communication I/F 249. The CPU 250 controls the operation of the finisher 111 by executing a control program stored in the memory 251. The memory 251 stores the control program for the finisher 111. The sheet discharge control unit 252 controls the conveyance and the discharging of the sheet, in accordance with an instruction from the CPU 250. The finishing processing unit 253 performs finishing processing such as stapling, punching, or saddle stitch bookbinding, in accordance with an instruction from the CPU 250.

<External Controller>

The external controller 102 includes a CPU 208, a memory 209, an HDD 210, a keyboard 211, a display 212, LAN I/Fs 213 and 214, and a video I/F 215. These devices are connected to each other via a system bus 216. The CPU 208 executes a program stored in the HDD 210 to control the operation of the external controller 102 as a whole (for example, reception of print data from the client PC 103, RIP processing, and transmission of print data to the printing system 101). The memory 209 stores programs and data required for the CPU 208 to perform various types of processing. The memory 209 operates as a work area for the CPU 208.

The HDD 210 stores various programs and data. The keyboard 211 is used for input of an operation instruction to the external controller 102 from the user. The display 212 is used, for example, for displaying information about the application being executed in the external controller 102 and an operation screen. The LAN I/F 213 is connected to the client PC 103 via the external LAN 104, and is used for communicating data such as a print instruction. The LAN I/F 214 is connected to the printing system 101 via the internal LAN 105, and is used for communicating data such as a print instruction. The external controller 102 is configured to be capable of communicating with the printing apparatus 107, the inserter 108, the verification apparatus 109, the large-capacity stacker 110, and the finisher 111 via the internal LAN 105 and the communication cable 260. The video I/F 215 is connected to the printing system 101 via the video cable 106 and is used for communicating data such as image data (print data).

<Client PC>

The client PC 103 includes a CPU 201, a memory 202, an HDD 203, a keyboard 204, a display 205, and a LAN I/F 206. These devices are connected to each other via a system bus 207. The CPU 201 executes a program stored in the HDD 203 to control operations of the devices via the system bus 207. Thus, various types of processing by the client PC 103 are implemented. For example, the CPU 201 executes a document processing program stored in the HDD 203 to generate print data and issue a print instruction. The memory 202 stores programs and data required for the CPU 201 to perform various types of processing. The memory 202 operates as a work area for the CPU 201.

The HDD 203 stores various applications (the document processing program for example), a program such as a printer driver, and various types of data. The keyboard 204 is used for input of an operation instruction to the client PC 103 from the user. The display 205 is used, for example, for displaying information about the application being executed in the client PC 103 and an operation screen. The LAN I/F 206 is communicatively connected to the external controller 102 via the external LAN 104. The CPU 201 communicates with the external controller 102 via the LAN I/F 206.

The memories 202, 209, 223, 234, 239, 246, and 251 are each formed by a storage apparatus that can store data and a program. For example, these memories may each be formed by a storage apparatus such as a volatile RAM, non-volatile ROM, an internal or external HDD, an internal or external SSD, or a USB memory.

<Example of Operation of Printing System>

Figure 3:
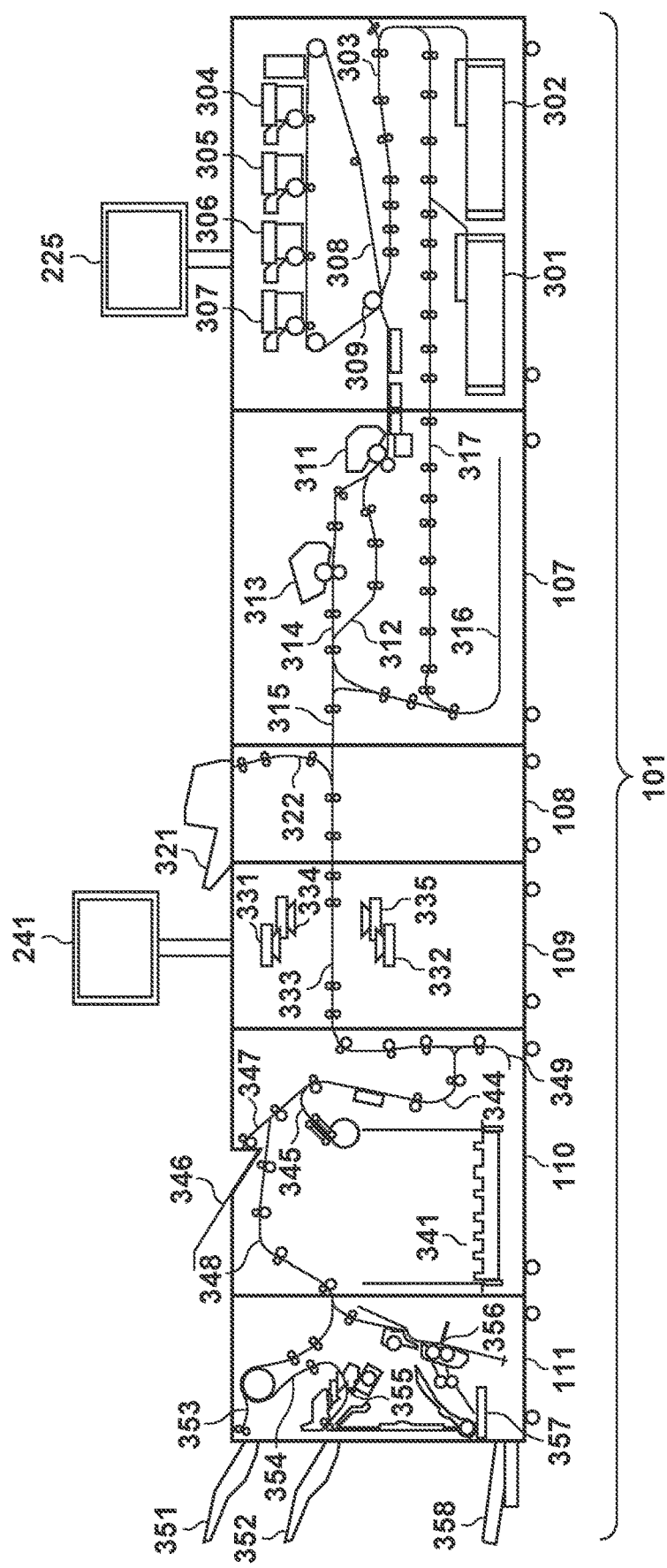
FIG. 3 is a cross-sectional view illustrating a hardware configuration example of the printing system.

FIG. 3 is a cross-sectional view illustrating a hardware configuration example of the printing system 101. A specific example of the operation of the printing system 101 will be described below with reference to FIG. 3.

In the printing apparatus 107, various sheets are stored in sheet decks 301 and 302. The sheets stored in each sheet deck are separated one by one from the uppermost position, to be fed to a conveyance path 303. Image forming stations 304 to 307, each including a photosensitive drum (photoreceptor), form toner images on the photosensitive drums using toner of different colors. Specifically, the image forming stations 304 to 307 form toner images using toner of yellow (Y), magenta (M), cyan (C), and black (K), respectively.

The toner images of the respective colors formed by the image forming stations 304 to 307 are sequentially superimposed, and transferred to an intermediate transfer belt 308 (primary transfer). The toner image transferred to the intermediate transfer belt 308 is conveyed to a secondary transfer position 309, by the rotation of the intermediate transfer belt 308. At the secondary transfer position 309, the toner image is transferred from the intermediate transfer belt 308 to the sheet conveyed on the conveyance path 303 (secondary transfer). The sheet after the secondary transfer is conveyed to a fix unit 311. The fix unit 311 includes a pressurizing roller and a heating roller. Fixing processing of fixing the toner image on the sheet is performed, with heat and pressure applied to the sheet while the sheet is passing between these rollers. The sheet that has passed through the fix unit 311 is conveyed to a connection point 315 between the printing apparatus 107 and the inserter, through a conveyance path 312. In this manner, a color image is formed (printed) on the sheet.

When the fixing processing is further required depending on the type of the sheet, the sheet that has passed through the fix unit 311 is guided to a conveyance path 314 provided with a fix unit 313. The fix unit 313 performs further fixing processing on the sheet conveyed on the conveyance path 314. The sheet that has passed through the fix unit 313 is conveyed to the connection point 315. When an operation mode for performing two-sided printing is set, a sheet that has had an image printed on a first surface and is conveyed on the conveyance path 312 or the conveyance path 314 is guided to a reversing path 316. The sheet reversed in the reversing path 316 is guided to the two-sided conveyance path 317, and is conveyed to the secondary transfer position 309. Thus, the toner image is transferred to the second surface of the sheet opposite to the first surface at the secondary transfer position 309. Then, when the sheet passes through the fix unit 311 (and the fix unit 313), the formation of the color image on the second surface of the sheet is completed.

The sheet that is conveyed to the connection point 315 after the completion of the image forming (printing) by the printing apparatus 107 is conveyed into the inserter 108. The inserter 108 includes an inserter tray 321 in which the insertion sheet is set. The inserter 108 performs processing of inserting the insertion sheet fed from the inserter tray 321, to a desired insertion position in a series of sheet set conveyed from the printing apparatus 107, to make the insertion sheet conveyed to the apparatus on the later stage (verification apparatus 109). The sheets that have passed through the inserter 108 are sequentially conveyed to the verification apparatus 109.

The verification apparatus 109 includes cameras 331 and 332 forming the imaging unit 240a and cameras 334 and 335 forming the imaging unit 240b, on a conveyance path 333 on which the sheet from the inserter 108 is conveyed. The cameras 332 and 335 are arranged in a position opposite to the cameras 331 and 334 with the conveyance path 333 provided in between. The cameras 331 and 334 are configured to read the upper surface (first surface) of the sheet. The cameras 332 and 335 are configured to read the lower surface (second surface) of the sheet. The cameras 331, 332, 334, and 335 may be formed by, for example, of a Contact Image Sensor (CIS) or may be formed by a line scan camera instead of the CIS.

The verification apparatus 109 performs the verification processing of verifying an image printed on a sheet conveyed on the conveyance path 333. Specifically, the verification apparatus 109 performs, at a timing when a sheet being conveyed reaches a predetermined position, read processing of reading an image on the sheet by using the imaging unit 240a (the cameras 331 and 332) and the imaging unit 240b (the cameras 334 and 335). Furthermore, the verification apparatus 109 verifies the image printed on the sheet based on the image obtained by the read processing. In the present embodiment, the verification apparatus 109 performs the verification processing by comparing the read image obtained by reading the image printed on the sheet, with a reference image registered in advance. The sheets that have passed through the verification apparatus 109 are sequentially conveyed to the large-capacity stacker 110.

The large-capacity stacker 110 includes a stack tray 341 serving as a tray on which the sheets, conveyed from the apparatus (verification apparatus 109) on the upstream side in the conveyance direction of the sheet, are stacked. The sheets that have passed through the verification apparatus 109 are conveyed on a conveyance path 344 in the large-capacity stacker 110. The sheets conveyed on the conveyance path 344 are guided to a conveyance path 345 and stacked on the stack tray 341.

The large-capacity stacker 110 further includes an escape tray 346 serving as a sheet discharge tray. In the present embodiment, the escape tray 346 is used for discharging a sheet which is determined to have abnormality in a printed image as a result of the verification by the verification apparatus 109. The sheets conveyed on the conveyance path 344 are guided to a conveyance path 347 and conveyed to the escape tray 346. The sheet conveyed without being stacked or discharged in the large-capacity stacker 110 is conveyed to the finisher 111 on the later stage, through a conveyance path 348.

The large-capacity stacker 110 further includes a reversing unit 349 that reverses the orientation of the sheet conveyed. For example, the reversing unit 349 is used for making the orientation of the sheet input to the large-capacity stacker 110 to be identical with the orientation in which the sheets are stacked on the stack tray 341 and are output from the large-capacity stacker 110. The reversing unit 349 does not perform the reversing operation on the sheet conveyed to the finisher 111 without being stacked in large-capacity stacker 110.

The finisher 111 executes a finishing function designated by the user, on the sheet that has been conveyed from the apparatus (the verification apparatus 109) on the upstream side in the conveyance direction of the sheet. In the present embodiment, the finisher 111 has finishing functions such as, for example, a stapling function (one or two points binding), a punching function (two or three holes), and a saddle stitch bookbinding function.

The finisher 111 includes two sheet discharge trays 351 and 352. The sheet conveyed to the finisher 111, when the sheet is not subjected to the finishing processing by the finisher 111, is discharged to the sheet discharge tray 351 through a conveyance path 353. The sheet conveyed to the finisher 111, when the sheet is subjected to finishing processing such as stapling processing by the finisher 111, is guided to a conveyance path 354. The finisher 111 uses a processing unit 355 to execute the finishing processing designated by the user on the sheet conveyed on the conveyance path 354, and discharges the sheet onto a sheet discharge tray 352. The sheet discharge trays 351 and 352 are each configured to be moved upward and downward. The finisher 111 can operate to stack the sheets, on which the finishing processing has been performed by the processing unit 355, onto the sheet discharge tray 351, by moving the sheet discharge tray 351 downward.

When the saddle stitch bookbinding processing is designated by the user, the finisher 111 performs the stapling processing at the center of the sheets using a saddle stitch processing unit 356, and then folds the sheets in half to generate a bookbinding product. The finisher 111 discharges the bookbinding product thus generated, onto a book tray 358 through a conveyance path 357. The book tray 358 has a belt conveyor configuration for conveying the bookbinding product stacked on the book tray 358 to the outside of the apparatus.

The registration processing for the reference image and the verification processing on the sheet (printed sheet) on which an image is printed, executed by the verification apparatus 109, will be described more in detail below with reference to FIG. 4 to FIG. 8B.

<Example of Read Image and Reference Image>

Figure 4:
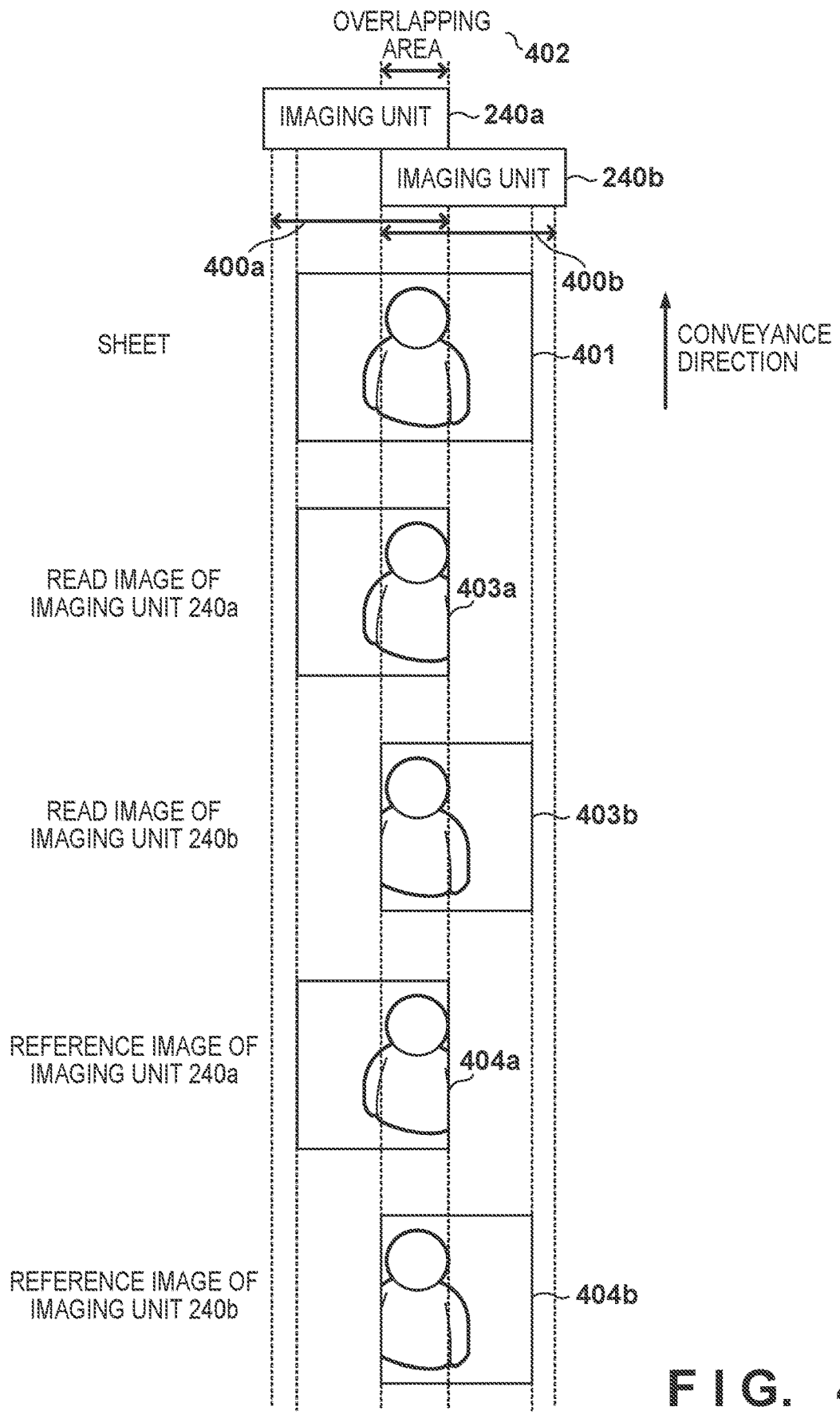
FIG. 4 is a diagram illustrating an example of read images and corresponding reference images.

FIG. 4 illustrates an example of read images obtained by the imaging units 240a and 240b of the verification apparatus 109 of the present embodiment and corresponding reference images. As illustrated in FIG. 4, the imaging unit 240a is arranged to perform reading in the region (read region 400a) on the left side relative to the conveyance direction of a sheet 401. The imaging unit 240b is arranged to perform reading in the region (read region 400b) on the right side relative to the conveyance direction of the sheet 401. The imaging units 240a and 240b are arranged to have the read region 400a and the read region 400b partially overlap in the predetermined direction (width direction) orthogonal to the conveyance direction of the sheet 401, as indicated by an overlap region 402 in FIG. 4.

The imaging unit 240a reads a portion of the image, printed on the sheet 401, passing through the read region 400a (an image printed on the left side region of the sheet 401) to generate a read image 403a. The imaging unit 240b reads a portion of the image, printed on the sheet 401, passing through the read region 400b (an image printed on the right side region of the sheet 401) to generate a read image 403b.

The verification apparatus 109 has a function of registering an image, selected from the read images generated by the imaging units 240a and 240b, as a reference image for verification in the verification processing. In FIG. 4, a reference image 404a is an example of a reference image corresponding to the imaging unit 240a, and a reference image 404b is an example of a reference image corresponding to the imaging unit 240b. In the present embodiment, as illustrated in FIG. 4, images with regions partially overlapping with each other are registered respectively as the reference image 404a corresponding to the imaging unit 240a and the reference image 404b corresponding to the imaging unit 240b. In the registration processing for the reference image, a single read image may be registered as the reference image, or an image obtained through superimposing or averaging processing on two or more selected read images may be registered as the reference image.

In the verification processing, the CPU 238 acquires the read images 403a and 403b by reading (capturing an image of) the sheet 401 being conveyed, by the imaging units 240a and 240b. Then, the CPU 238 compares the read images 403a and 403b respectively with the reference images 404a and 404b, stored in the memory 239, to perform verification on the image printed on the sheet.

<Example of Registration of Reference Image>

Based on the images obtained by the reading by the plurality of imaging units 240a and 240b, the verification apparatus 109 of the present embodiment registers reference images respectively corresponding to the plurality of imaging units. The reference image may also be registered based on the print data used for printing the image on the sheet conveyed.

Figure 5A:
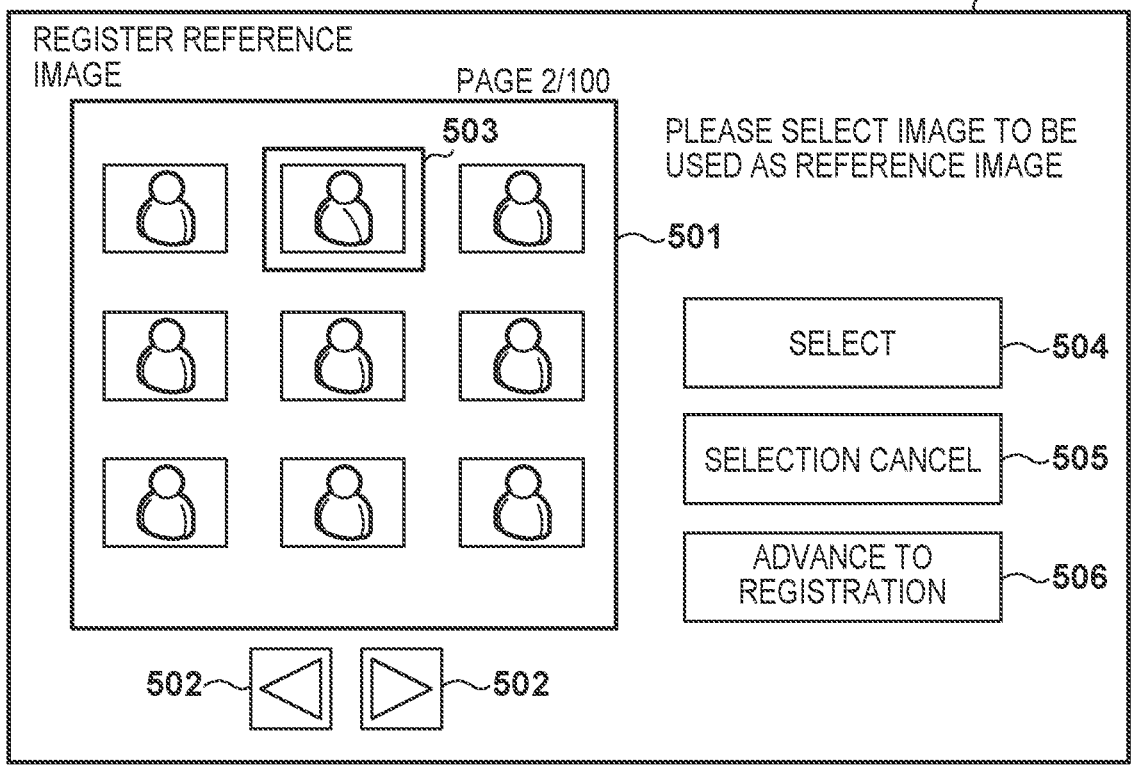
FIG. 5A is a diagram illustrating an example of a selection screen for a reference image of a verification apparatus.
Figure 5B:
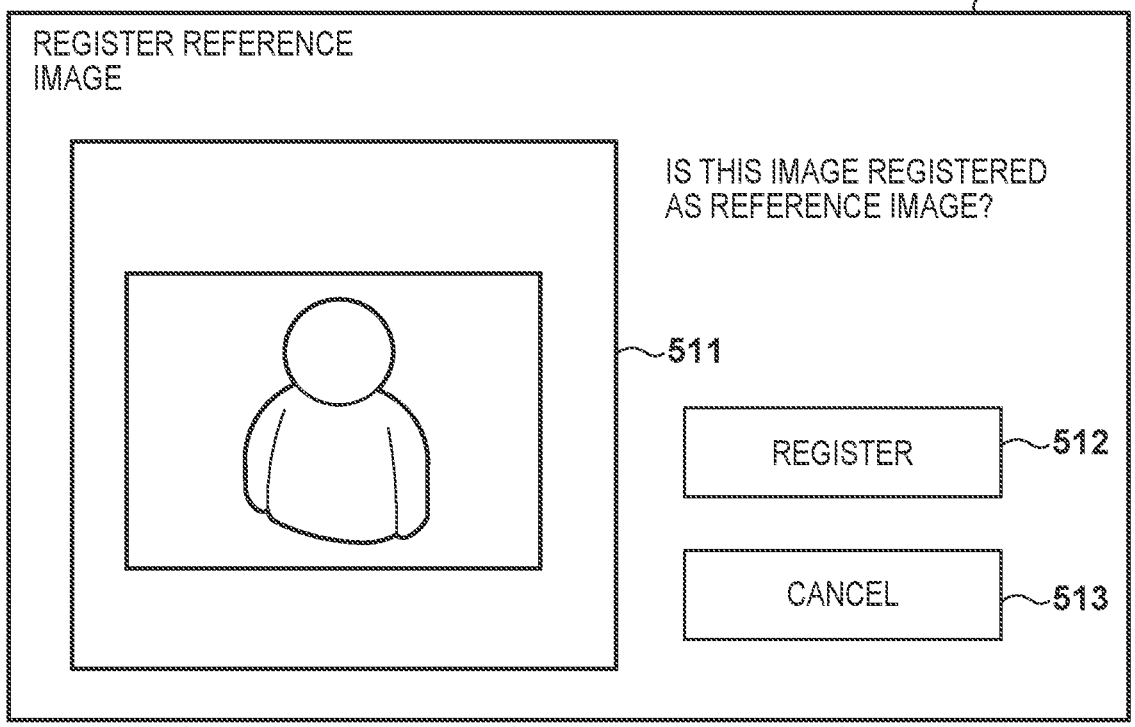
FIG. 5B is a diagram illustrating an example of a registration screen for a reference image of a verification apparatus.

FIG. 5A and FIG. 5B respectively illustrate a selection screen 500 and a registration screen 510 that are examples of operation screens used for registering the reference image in the verification apparatus 109. The selection screen 500 is an example of an operation screen displayed on the display unit 241 to be used for selecting the read image to be used as the reference image. The selection screen 500 includes an image display portion 501 where a thumbnail of the read image is displayed. An image obtained by synthesizing the read image of the imaging unit 240a and the read image of the imaging unit 240b is displayed as the read image on the image display portion 501, to facilitate the recognition by the user.

The user presses (touches) an image switch button 502 on the selection screen 500 to move an image selection frame 503 and presses an image selection button 504 to select the read image to be used as the reference image. A selection cancel button 505 is a button for deselecting the selected image. To advance the processing to registration of the reference image upon completion of the selection of the read image, the user presses a button 506. Thus, the screen displayed on the display unit 241 transitions from the selection screen 500 to the registration screen 510.

The registration screen 510 is an example of an operation screen displayed on the display unit 241 to be used for registering the reference image. The registration screen 510 includes an image display portion 511 on which an image that is a candidate for the reference image is displayed. When only a single read image is selected on the selection screen 500, the selected image is displayed in the image display portion 511. When two or more read images are selected on the selection screen 500, an image obtained through superimposing or averaging processing on the plurality of selected read images is displayed in the image display portion 511.

The user can issue an instruction indicating that the image displayed in the image display portion 511 is to be registered as the reference image, by pressing (touching) a registration button 512 on the registration screen 510. A cancel button 513 is a button for instructing cancellation of the registration of the reference image. When the cancel is instructed using the cancel button 513, the screen displayed on the display unit 241 returns to the selection screen 500 from the registration screen 510.

<Example of Occurrence of Sheet Conveyance Misalignment>

Figure 6:
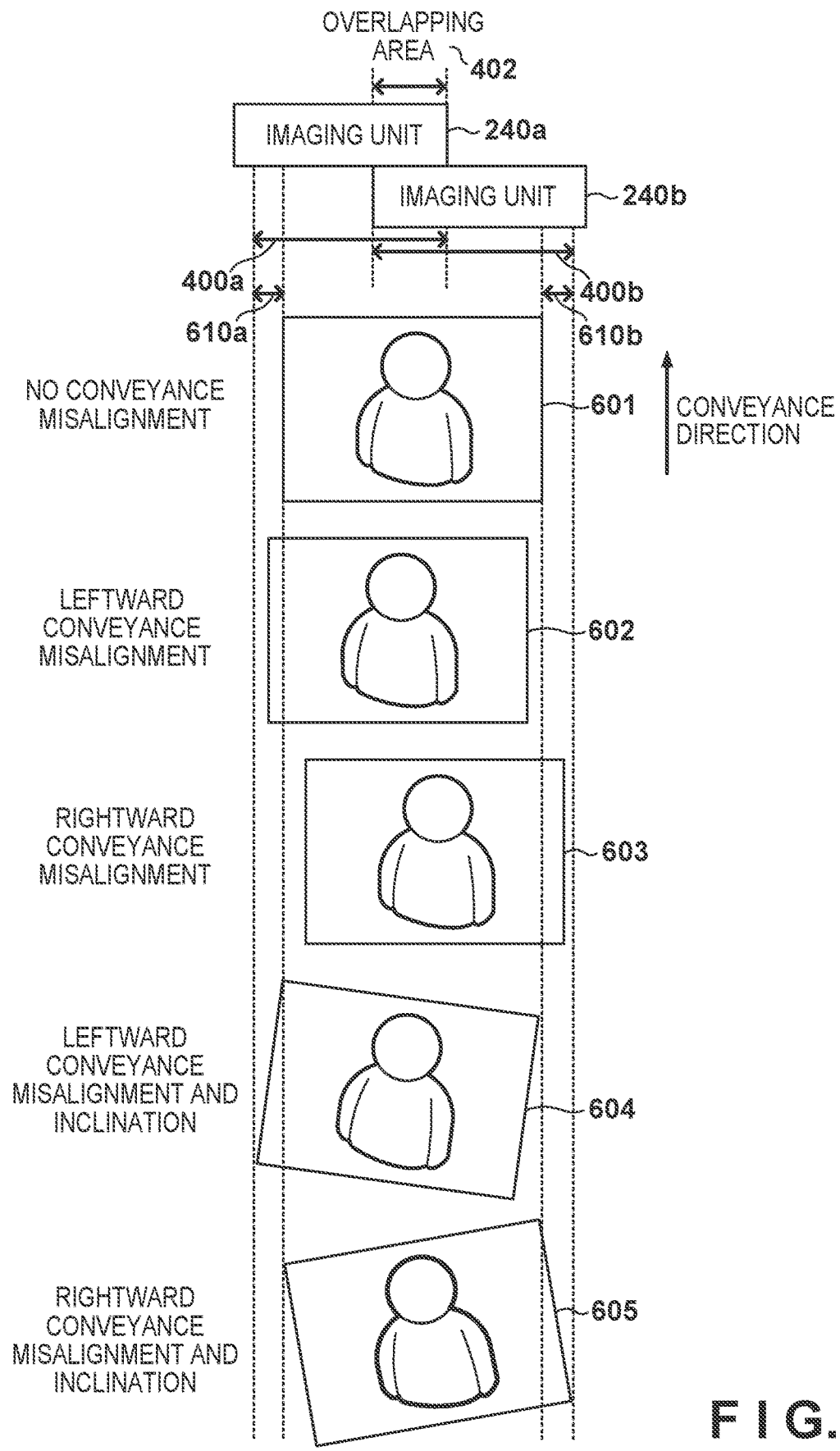
FIG. 6 is a diagram illustrating an example of a conveyance state of a sheet conveyed in the verification apparatus.

FIG. 6 illustrates an example of a conveyance state of a sheet conveyed in the verification apparatus 109. In FIG. 6, a sheet 601 is an example of a sheet without conveyance misalignment, and sheets 602 to 605 are examples of sheets under different types of conveyance misalignment. In this example, the state without the conveyance misalignment, as in the case of the sheet 601, corresponds to a state where the center position of the sheet being conveyed and the center position of the conveyance path 333 match in the width direction orthogonal to the conveyance direction. The state where the conveyance misalignment has occurred corresponds to a state where a misalignment (deviation) from the position of the sheet 601 has occurred.

The sheet 602 is an example of a sheet with leftward conveyance misalignment relative to the conveyance direction, and is being conveyed on the conveyance path 333 while being shifted toward the left side. The sheet 603 is an example of a sheet with rightward conveyance misalignment relative to the conveyance direction, and is being conveyed on the conveyance path 333 while being shifted toward the right side. The sheet 604 is an example of a sheet with leftward conveyance misalignment and inclination relative to the conveyance direction, and is being conveyed on the conveyance path 333 while being shifted toward the left side. The sheet 605 is an example of a sheet with rightward conveyance misalignment and inclination relative to the conveyance direction, and is being conveyed on the conveyance path 333 while being shifted toward the right side.

In the example of FIG. 6, a maximum value 610a of the leftward conveyance misalignment of the sheet corresponds to a misalignment amount in the width direction when the position of the sheet being conveyed is misaligned farthest toward the left side (to the left side edge portion of the conveyance path 333) on the conveyance path 333, as the position of the sheet 601 being a reference position. A maximum value 610b of the rightward conveyance misalignment of the sheet corresponds to a misalignment amount in the width direction when the position of the sheet being conveyed is misaligned farthest toward the right side (to the right side edge portion of the conveyance path 333) on the conveyance path 333, as the position of the sheet 601 being a reference position. The maximum values 610a and 610b of the conveyance misalignment are uniquely determined depending on the relative positional relationship between the imaging units 240a and 240b and the conveyance path 333, and the size of the sheet conveyed.

The possible maximum misalignment width in the width direction, of the conveyance misalignment of the sheet being conveyed on the conveyance path 333 in the verification apparatus 109 corresponds to the sum of the maximum value 610a of the leftward conveyance misalignment and the maximum value 610b of the rightward conveyance misalignment. In the present embodiment, the length of the overlap region 402 between the read region 400a and the read region 400b in the width direction is set to be equal to or larger than the possible maximum misalignment width of the conveyance misalignment of the sheet being conveyed in the verification apparatus 109. Thus, the imaging unit 240a and the imaging unit 240b are arranged to satisfy the condition (length of overlap region 402≥maximum misalignment width of sheet conveyance misalignment) in the width direction of the sheet.

With this configuration, the entire region on the sheet can be read using both of the imaging unit 240a and the imaging unit 240b, even when the conveyance misalignment in any of the leftward rightward directions of the sheet being conveyed occurs. As a result, verification of the printed image can be performed over the entire region on the sheet being conveyed.

<Sheet Verification Processing>

In the verification processing, the verification apparatus 109 acquires the read images by reading the image on the sheet using the imaging units 240a and 240b. In this case, when the conveyance misalignment as illustrated in FIG. 6 occurs, the size of the portion of the sheet being conveyed passing through the read region 400a changes. As a result, the size of the read image corresponding to the sheet portion passed through the read region 400a obtained through the reading by the imaging unit 240a may change to a size different from the size of the reference image for verification. The same applies to the read image obtained by the imaging unit 240b. When the sizes of the read images obtained using the imaging units 240a and 240b differ from the size of the reference image registered in advance, the verification on the sheet may fail to be performed.

Figure 7:
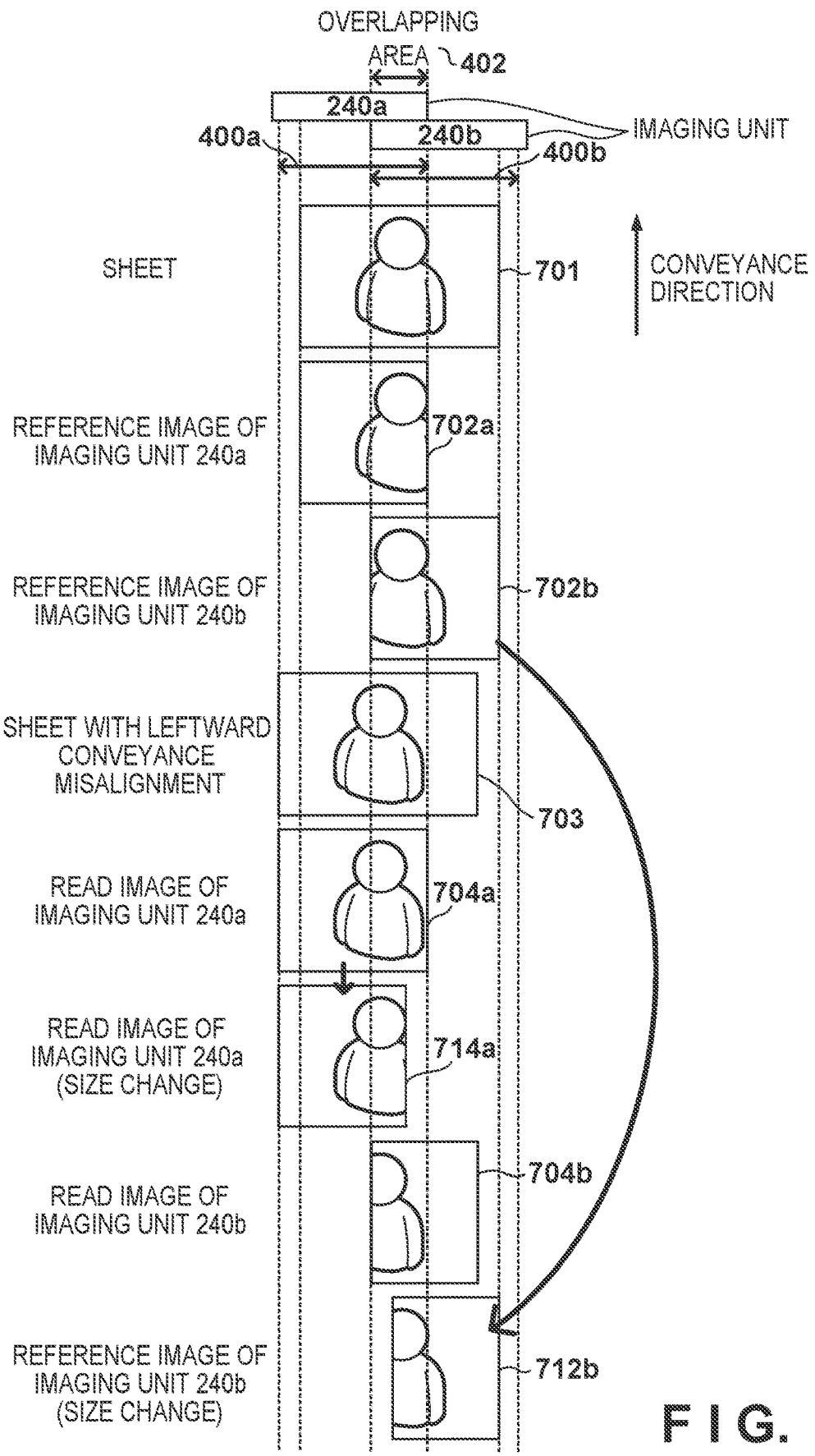
FIG. 7 is a diagram illustrating an example of verification processing on a sheet conveyed in the verification apparatus.

In the present embodiment, the sheet that is the verification target can be verified even when the conveyance misalignment of the sheet occurs as described above. This is achieved by changing the size of one of the read image and the reference image to match that of the other one, and then comparing the images. FIG. 7 is illustrating an example of verification processing on a sheet conveyed in the verification apparatus 109. As illustrated in FIG. 7, the verification processing of the present embodiment is described below using, as an example, a case where a sheet 703 that is the verification target is under leftward conveyance misalignment relative to the conveyance direction (thus, the sheet 703 is being conveyed while being shifted toward the left side on the conveyance path 333).

In FIG. 7, a sheet 701 is an example of a sheet with no conveyance misalignment. Reference images 702a and 702b are reference images respectively corresponding to the imaging units 240a and 240b. The reference images 702a and 702b are reference images registered in advance, based on read images obtained by reading the sheet 701 without the conveyance misalignment using the imaging unit 240a and the imaging unit 240b. In the verification processing of the present embodiment, the following processing is performed using each of the imaging unit 240a and the imaging unit 240b.

—Processing Using Imaging Unit 240a

The CPU 238 acquires a read image 704a by controlling the imaging unit 240a to read the sheet 703, conveyed to the verification apparatus 109, in the read region 400a. At this time, the CPU 238 extracts (crops) an image corresponding to the sheet portion passing through the read region 400a from the read image corresponding to the entire read region 400a, by detecting the edge portion of the sheet 703 through edge detection processing. The CPU 238 stores the image thus extracted as the read image 704a corresponding to the imaging unit 240a.

Next, the CPU 238 performs comparison processing of comparing the width direction sizes of the read image 704a thus acquired and the reference image 702a stored in the memory 239. As described above, the reference image 702a is registered in advance as the reference image corresponding to the imaging unit 240a. The CPU 238 performs size change processing of changing the size of the one of the read image 704a corresponding to the imaging unit 240a and the reference image 702a determined to be larger as a result of the comparison processing, to match the size of the smaller one. Thus, the size of the read image 704a and the size of the reference image 702a are equalized.

In the example of FIG. 7, the size change processing is performed on the read image 704a having a larger width direction size than the reference image 702a, whereby a read image 714a after the size change is acquired. In this size change processing, extraction (cropping) is performed on the read image 704a that is the processing target in accordance with the size of the reference image 702a, with an edge portion (left edge), of the two edge portions of the read image 704a along the conveyance direction of the sheet, being a reference, where the edge portion (left edge) is corresponding to the edge portion of the sheet 703. Specifically, a region of the same width direction size as the reference image 702a is cropped from the read image 704a with the left edge of the read image as the reference point, whereby the read image 714a after the size change is acquired.

Furthermore, the CPU 238 verifies the read image by comparing the read image 714a after the size change with the corresponding reference image 702a. The CPU 238 stores the result of the verification in the memory 239, as the result of processing using the imaging unit 240a.

—Processing Using Imaging Unit 240b

The processing using the imaging unit 240b is similar to the processing using the imaging unit 240a, and is performed as follows. The CPU 238 acquires a read image 704b by controlling the imaging unit 240b to read the sheet 703, conveyed to the verification apparatus 109, in the read region 400b. At this time, the CPU 238 extracts (crops) an image corresponding to the sheet portion passing through the read region 400b from the read image corresponding to the entire read region 400b, by detecting the edge portion of the sheet 703 through edge detection processing. The CPU 238 stores the image thus extracted as the read image 704b corresponding to the imaging unit 240b.

Next, the CPU 238 performs comparison processing of comparing the width direction sizes of the read image 704b thus acquired and the reference image 702b stored in the memory 239. As described above, the reference image 702b is registered in advance as the reference image corresponding to the imaging unit 240b. The CPU 238 performs size change processing of changing the size of the one of the read image 704b corresponding to the imaging unit 240b and the reference image 702b determined to be larger as a result of the comparison processing, to match the size of the smaller one. Thus, the size of the read image 704b and the size of the reference image 702b are equalized.

In the example of FIG. 7, the size change processing is performed on the reference image 702b having a larger width direction size than the read image 704b, whereby a reference image 712b after the size change is acquired. In this size change processing, extraction (cropping) is performed on the reference image 702b that is the processing target in accordance with the size of the read image 704b, with an edge portion (right edge), of the two edge portions of the reference image 702b along the conveyance direction of the sheet, being a reference point, where the edge portion (right edge) is corresponding to the edge portion of the sheet 703 serving. Specifically, a region of the same width direction size as the read image 704b is cropped from the reference image 702b with the right edge of the reference image as the reference point, whereby the reference image 712b after the size change is acquired.

Furthermore, the CPU 238 verifies the read image by comparing the read image 704b with the corresponding reference image 712b after the size change. The CPU 238 stores the result of the verification in the memory 239, as the result of processing using the imaging unit 240b.

—Acquisition of Verification Result

The CPU 238 acquires the final verification result for the conveyed sheet, based on the result of the verification using the imaging unit 240a and the result of the verification using the imaging unit 240b. Specifically, the CPU 238 determines that the image printed on the sheet is normal (the image has no defect) when the read image obtained by the imaging unit 240a and the image obtained by the imaging unit 240b are both normal. On the other hand, the CPU 238 determines that the image printed on the sheet is abnormal (the image has a defect) when at least one of the read image obtained by the imaging unit 240a and the image obtained by the imaging unit 240b is abnormal. The CPU 238 acquires a result of such determination, as the verification result for the sheet.

In the present embodiment, as described above with reference to FIG. 6, the size (length), in the width direction, of the overlap region 402 where the read region 400a and the read region 400b overlap is set to be equal to or larger than the possible maximum misalignment width of the conveyance misalignment of the sheet conveyed. Thus, the region to be excluded from the reference image in the size change processing (for example, the region excluded from the reference image 702b for the change to the reference image 712b) corresponds to a part of the overlap region 402. The region excluded from the reference image corresponding to one of the imaging units 240a and 240b is a target of the verification using the other one of the imaging units. Thus, with the configuration of the verification apparatus 109 according to the present embodiment, by using both the imaging unit 240a and the imaging unit 240b, the verification processing can be performed on the entire region of the sheet conveyed to be the target.

When inclination relative to the conveyance direction of the sheet occurs as in the cases of the sheets 604 and 605 illustrated in FIG. 6, correction processing of correcting such an inclination is performed on the read images respectively obtained by the imaging units 240a and 240b. For example, rotation correction may be performed on the read image to make the edge portion of the sheet along the conveyance direction, detected in the read image by the edge detection processing, become parallel with the conveyance direction. Alternatively, the rotation correction may be performed on the read image to make the edge portion of the sheet along the width direction orthogonal to the conveyance direction of the sheet become parallel to the width direction. Then, using the read image after the rotation correction and the reference image, the verification described above is performed.

<Processing Procedure>

Figure 8A:
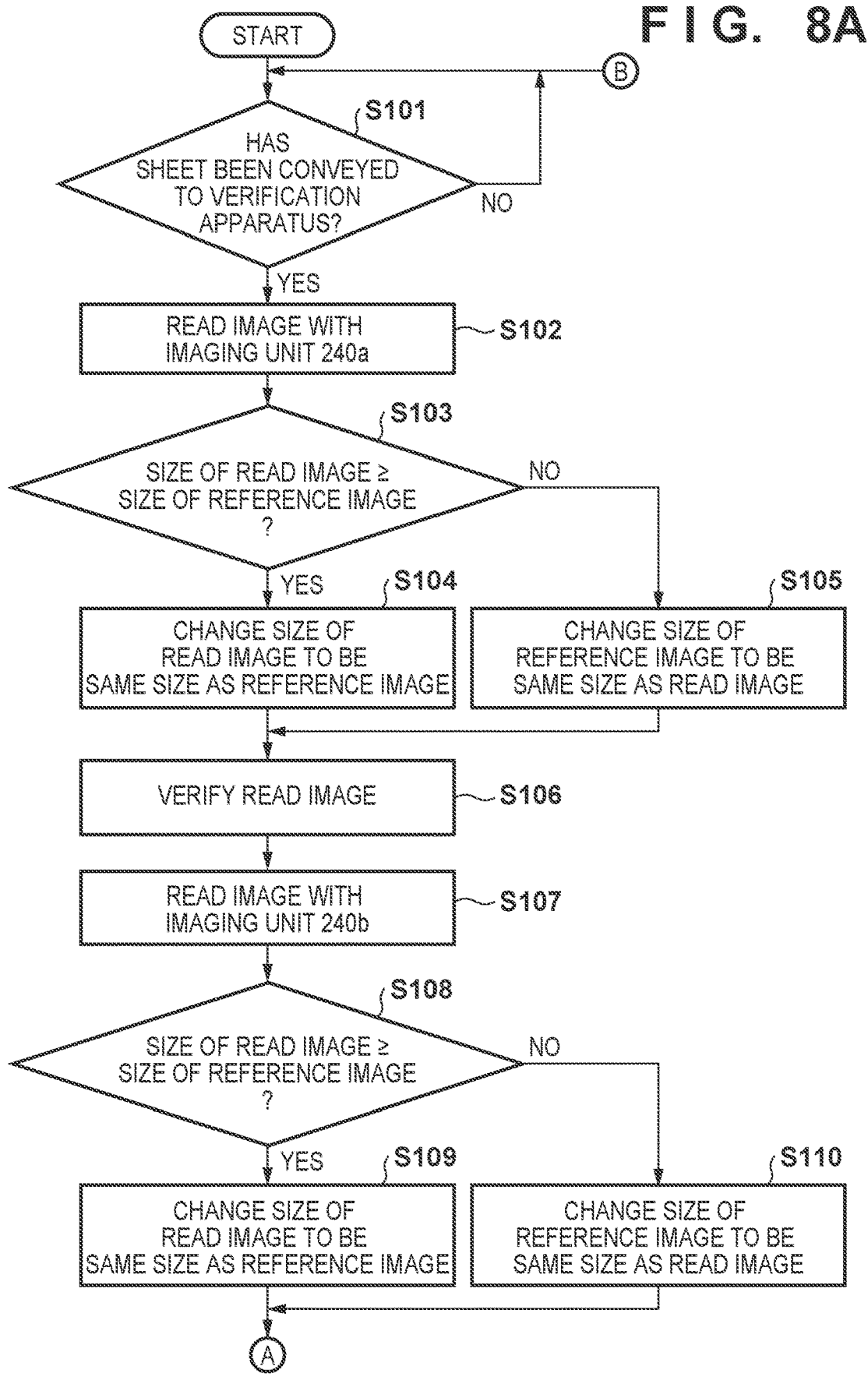
FIG. 8A is a flowchart illustrating a procedure of verification processing by the verification apparatus.
Figure 8B:
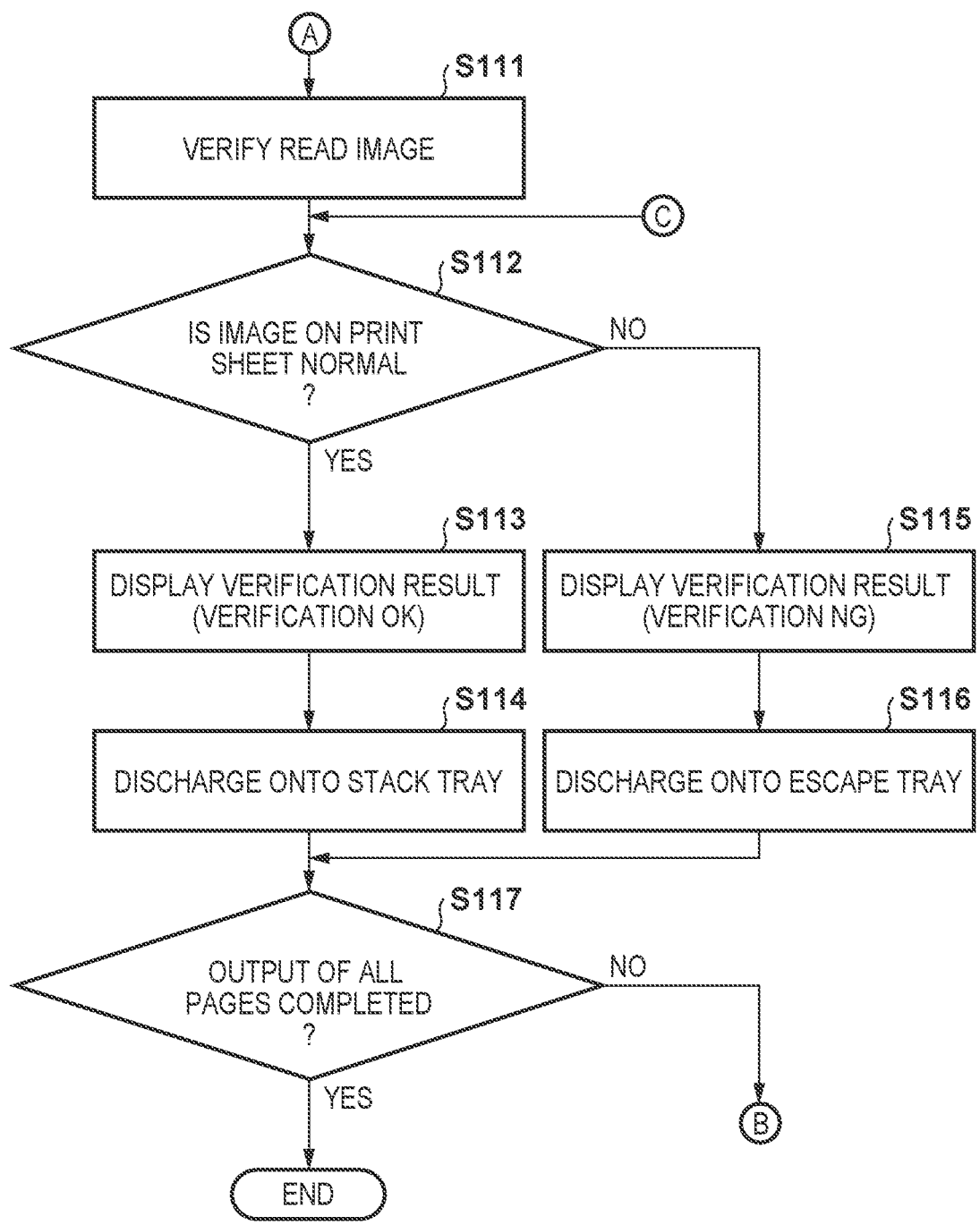
FIG. 8B is a flowchart illustrating a procedure of verification processing by the verification apparatus.

FIG. 8A and FIG. 8B are flowcharts illustrating a procedure of the verification processing by the verification apparatus 109 of the present embodiment. Processing in each step illustrated in the figures is implemented when the CPU 238 executes the control program stored in the memory 239.

When a print job starts to be executed in response to a user operation, the CPU 238 starts the processing of the procedure in FIG. 8A and FIG. 8B. First of all, in step S101, the CPU 238 determines whether the sheet has been conveyed to the verification apparatus 109. When the sheet is detected by a sensor (not illustrated) arranged in the conveyance path 333, the CPU 238 determines that the sheet has been conveyed, and advances the processing to step S102.

In step S102, the CPU 238 controls the imaging unit 240a to capture an image of the conveyed sheet, to read an image printed on the sheet. As described above, by using the imaging unit 240a, an image printed in the left side region of the sheet is read. The CPU 238 stores the read image obtained by the reading in the memory 239, and advances the processing to step S103.

In step S103, the CPU 238 performs the comparison processing for comparison, in the width direction size, between the read image obtained in step S102 and the corresponding reference image stored in the memory 239. Before executing this comparison processing, the CPU 238 acquires the read image corresponding to the sheet portion from the read image corresponding to the entire read region 400a, by detecting the edge portion of the sheet through the edge detection processing. Upon detecting the inclination of the conveyed sheet as described above as a result of the detecting the edge portion of the sheet, the CPU 238 may perform rotation correction on the read image to correct such inclination. The CPU 238 advances the processing to step S104 when the result of the comparison processing in step S103 indicates that the size of the read image in the width direction of the sheet is equal to or larger than the size of the reference image, and otherwise advances the processing to step S105.

In step S104, the CPU 238 performs the change processing to change the size of the read image. As described with reference to FIG. 7, the CPU 238 changes the size of the read image, by cropping the region of the same size as the reference image and excludes the remaining region (region on the right edge side), with the left edge of the read image being the reference point, in the width direction of the sheet. The region excluded from the read image corresponds to a region unnecessarily read by the imaging unit 240a due to the conveyance misalignment of the sheet. The CPU 238 stores the read image, after the size change, in the memory 239.

On the other hand, in step S105, the CPU 238 performs the change processing to change the size of the reference image. As described with reference to FIG. 7, the CPU 238 changes the size of the reference image, by cropping the region of the same size as the read image and excluding the remaining region (region on the right edge side), with the left edge of the reference image being the reference point, in the width direction of the sheet. The region excluded from the reference image corresponds to a region failed to be read by the imaging unit 240a (a region that has not passed through the read region 400a) due to the conveyance misalignment of the sheet. The CPU 238 stores the reference image, after the size change, in the memory 239.

Upon completing the size change processing on the read image or the reference image, the CPU 238 advances the processing to step S106 from step S104 or S105. In step S106, the CPU 238 verifies the read image by comparing the read image after the size change with the corresponding reference image. The CPU 238 stores the verification result in the memory 239. This verification is for verifying whether the read image obtained by the imaging unit 240a is normal (the read image has no defect), based on the result of the comparison between the read image and the reference image. When the verification on the read image is completed, the CPU 238 advances the processing to step S107.

In steps S107 to S111, the CPU 238 performs processing similar to that in steps S102 to S106, for the imaging unit 240b.

In step S107, the CPU 238 controls the imaging unit 240b to capture an image of the conveyed sheet, to read an image printed on the sheet. As described above, by using the imaging unit 240b, an image printed in the right side region of the sheet is read. The CPU 238 stores the read image obtained by the reading in the memory 239, and advances the processing to step S108.

In step S108, the CPU 238 performs the comparison processing for comparison, in the width direction size, between the read image obtained in step S107 and the corresponding reference image stored in the memory 239, as in step S103. The CPU 238 advances the processing to step S109 when the result of the comparison processing indicates that the size of the read image in the width direction of the sheet is equal to or larger than the size of the reference image, and otherwise advances the processing to step S110.

In step S109, the CPU 238 performs the change processing to change the size of the read image. Specifically, the CPU 238 changes the size of the read image, by cropping the region of the same size as the reference image and excluding the remaining region (region on the left edge side), with the right edge of the read image being the reference point, in the width direction of the sheet. On the other hand, in step S110, the CPU 238 performs the change processing to change the size of the reference image. Specifically, the CPU 238 changes the size of the reference image, by cropping the region of the same size as the read image and excluding the remaining region (region on the left edge side), with the right edge of the reference image being the reference point, in the width direction of the sheet.

As described above, in the present embodiment, the CPU 238 compares the sizes in the predetermined direction (width direction) of the read images, obtained by reading an image on the sheet respectively by the imaging units 240a and 240b, with the size in the predetermined direction (width direction) of the corresponding reference image. When the width direction size of the read image is larger than the width direction size of the reference image, the CPU 238 changes the width direction size of the read image to the equal width direction size of the reference image. On the other hand, when the width direction size of the reference image is larger than the width direction size of the read image, the CPU 238 changes the width direction size of the reference image to the equal width direction size of the read image.

Upon completing the size change processing on the read image or the reference image, the CPU 238 advances the processing to step S111 from step S109 or S110. In step S111, the CPU 238 verifies the read image by comparing the read image after the size change with the corresponding reference image. The CPU 238 stores the verification result in the memory 239, and advances the processing to step S112.

In step S112, the CPU 238 determines whether the image on the printed sheet is normal, based on the verification result obtained in steps S106 and S111. The CPU 238 determines that the image on the printed sheet is normal (the image has no defect) when the read image obtained by the imaging unit 240a and the image obtained by the imaging unit 240b are both normal, and advances the processing to step S113. On the other hand, the CPU 238 determines that the image on the printed sheet is abnormal (the image has a defect) when at least one of the read image obtained by the imaging unit 240a and the image obtained by the imaging unit 240b is abnormal, and advances the processing to step S115.

In this manner, the CPU 238 determines whether the read image corresponding to each of the plurality of imaging units 240a and 240b is normal, and determines that the image printed on the sheet is normal (image has no defect) if both read images are normal. On the other hand, the CPU 238 determines that the image printed on the sheet is abnormal (image has a defect) if any of the read images is abnormal.

In step S113, the CPU 238 displays the verification result indicating that the image on the printed sheet is normal, on the display unit 241 of the verification apparatus 109. In step S114, the CPU 238 instructs the printing apparatus 107 to discharge the printed sheet on which the verification processing has been performed, onto the stack tray 341 of the large-capacity stacker 110, and advances the processing to step S117. In this case, the printing apparatus 107 instructs the large-capacity stacker 110 to discharge the conveyed printed sheet onto the stack tray 341, based on the instruction from the verification apparatus 109.

On the other hand, in step S115, the CPU 238 displays the verification result indicating that the image on the printed sheet is abnormal (the image has a defect), on the display unit 241 of the verification apparatus 109. In step S116, the CPU 238 instructs the printing apparatus 107 to discharge the printed sheet onto the escape tray 346 of the large-capacity stacker 110, and advances the processing to step S117. In this case, the printing apparatus 107 instructs the large-capacity stacker 110 to discharge the conveyed printed sheet onto the escape tray 346, based on the instruction from the verification apparatus 109.

In this manner, the CPU 238 performs discharge control to discharge the sheet determined to be normal and the sheet determined to be abnormal, as a result of the verification on the image printed on the sheet, to respective discharge destinations different from each other.

In step S117, the CPU 238 determines whether the output of all the pages that are the print target of the print job has been completed. When the output of all the pages has not been completed yet, the CPU 238 returns the processing to step S101, and performs the verification processing on the next sheet conveyed. On the other hand, when the output of all the pages has been completed (when the verification processing on the sheet on which the image of the final page is printed has been completed), the CPU 238 terminates the verification processing through the procedure in FIG. 8A and FIG. 8B.

In the procedure in FIG. 8A and FIG. 8B, when the size of the read image and the size of the reference image are equal in step S103 or S108, the processing may be advanced to step S106 or S111, and the image size change processing thereafter may be omitted. The processing for the read image obtained by the imaging unit 240a (steps S102 to S106) and the processing for the read image obtained by the imaging unit 240b (steps S107 to S111), which are executed in this order in the procedure in FIG. 8A and FIG. 8B, may be executed in the reverse order or may be executed in parallel.

As described above, the verification apparatus 109 of the present embodiment includes a plurality of imaging units (the imaging units 240a and 240b) configured to perform reading in different read regions in a predetermined direction (width direction) orthogonal to the conveyance direction of the sheet. The read regions corresponding to the imaging units 240a and 240b adjacent to each other partially overlap with each other. The verification apparatus 109 uses the plurality of imaging units to read an image on a sheet conveyed. The verification apparatus 109 performs processing of changing the size, in a predetermined direction (width direction), of larger one of the read image obtained by each of the plurality of imaging units by reading the image on the sheet and the corresponding reference image, to match the size of the smaller one. The verification apparatus 109 further performs the verification by comparing the read image corresponding to each of the plurality of imaging units after the image size change processing with the corresponding reference image.

As described above, in the present embodiment with the configuration where the read regions corresponding to the adjacent imaging units partially overlap with each other, the verification on the read image is performed with the size of one of the read image corresponding to each of the imaging units and the corresponding reference image being adjusted so that the images have the coordinated size. Thus, the sheet that is the verification target can be verified even when the conveyance misalignment of the sheet occurs. Furthermore, the verification precision can be prevented from being degraded by the conveyance misalignment.

Furthermore, in the present embodiment, the plurality of imaging units 240a and 240b are arranged to make the size, in the predetermined direction, of the overlap region 402, where the read regions corresponding to the plurality of imaging units overlap, become equal to or larger than the maximum misalignment width in the predetermined direction in a case where the conveyance misalignment of the sheet conveyed on the conveyance path 333 occurs. This configuration more effectively guarantees that the image printed on a sheet that is the verification target can be entirely verified, even when the conveyance misalignment of the sheet occurs.

The present embodiment can also be modified as follows. Specifically, the verification apparatus 109 identifies the size of one of the read image obtained by reading the image on the sheet by each of the plurality of imaging units 240a and 240b and the corresponding reference image, having a smaller size in the predetermined direction (width direction). Furthermore, the verification apparatus 109 compares a read image corresponding to each of the plurality of imaging units 240a and 240b and the corresponding reference image, about the region of the identified size in the predetermined direction (width direction), to verify the read image. In this manner, instead of performing the image size change processing, the region for comparing the images (the size of the region) may be identified to match the size of one of the read image and the corresponding reference image having a smaller size in the predetermined direction (width direction), and the images may be compared about the identified region. Also with performing such processing, an effect similar to that described above can be obtained.

Second Embodiment

In the first embodiment, images with regions partially overlapping with each other are used as the reference images respectively corresponding to the imaging units 240a and 240b adjacent to each other. In the second embodiment on the other hand, a description will be given on an example of a configuration of performing the verification processing on a sheet using images without such an overlap region as the reference image. In the following, differences from the first embodiment will be mainly described.

Figure 9:
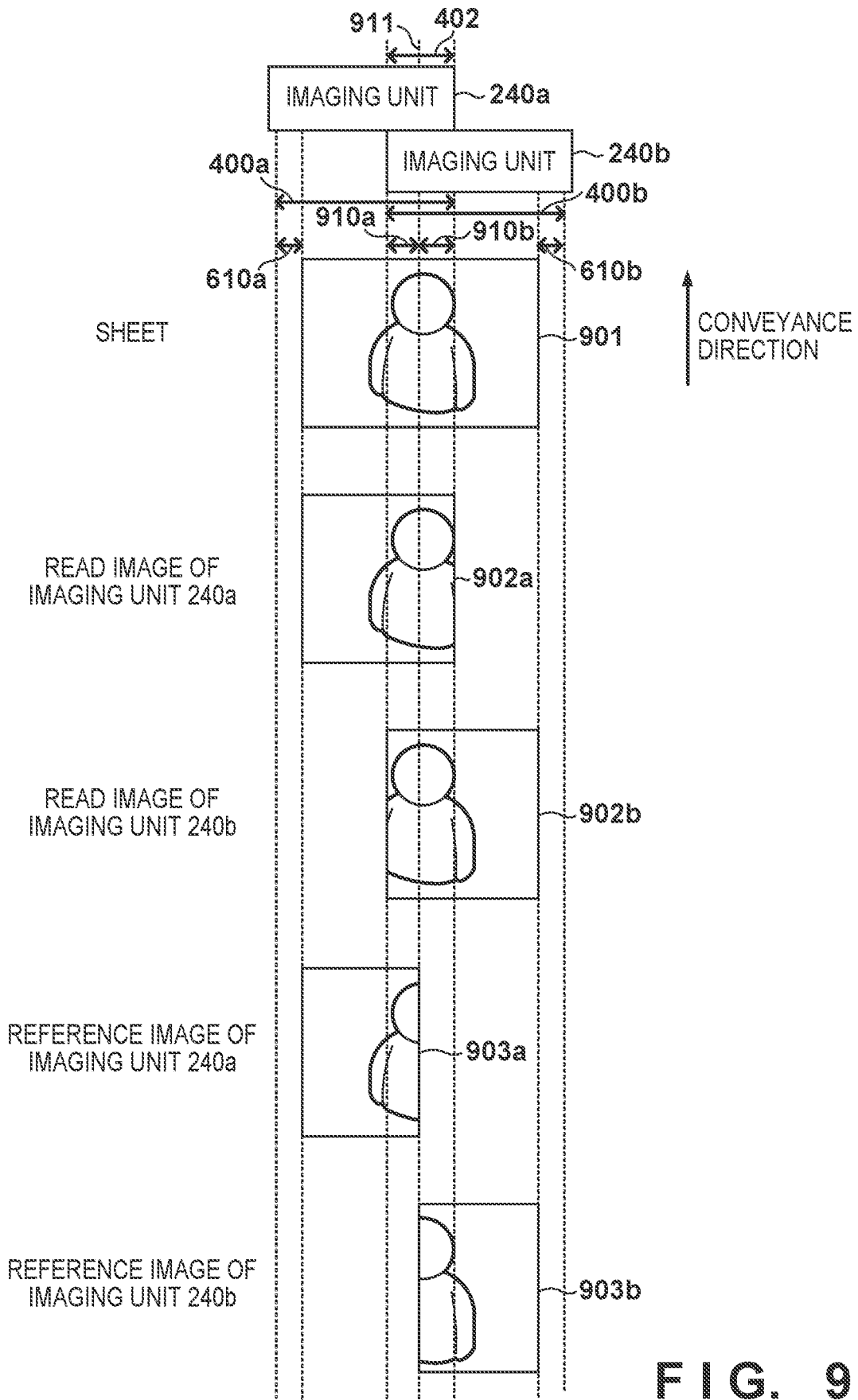
FIG. 9 is a diagram illustrating an example of read images and corresponding reference images (second embodiment).

FIG. 9 illustrates an example of read images obtained by the imaging units 240a and 240b of the verification apparatus 109 of the present embodiment and corresponding reference images. As in the first embodiment, the imaging units 240a and 240b are arranged to perform the reading respectively in the read regions 400a and 400b. The imaging units 240a and 240b are arranged to make the read region 400a and the read region 400b partially overlap in the overlap region 402. In the present embodiment, a boundary line 911, which will be described later, is set in the overlap region 402.

As in the first embodiment, the imaging unit 240a reads a portion of an image, printed on a sheet 901, passing through the read region 400a (an image printed on the left side region of the sheet 901) to generate a read image 902a. As in the first embodiment, the imaging unit 240b reads a portion of the image, printed on the sheet 901, passing through the read region 400b (an image printed on the right side region of the sheet 901) to generate a read image 902b.

A reference image 903a is an example of a reference image corresponding to the imaging unit 240a, and a reference image 903b is an example of a reference image corresponding to the imaging unit 240b. In the present embodiment, images obtained by splitting the image on the sheet 901 at the boundary line 911 are registered as the reference image 903a corresponding to the imaging unit 240a and the reference image 903b corresponding to the imaging unit 240b, as illustrated in FIG. 9. Thus, the reference images 903a and 903b include no overlap region, which are different from the reference images 404a and 404b illustrated as an example in FIG. 4 in the first embodiment. The sum of the size of the reference image 903a and the size of the reference image 903b matches the size of the image printed on the sheet 901.

Specifically, the reference image 903a is an image obtained by cropping (extracting), in the read image 902a, a region between an edge portion of a sheet portion (the edge portion of the image printed on the sheet 901) and the boundary line 911 along the conveyance direction of the sheet 901. The reference image 903b is an image obtained by cropping, in the read image 902b, a region between an edge portion of a sheet portion (the edge portion of the image printed on the sheet 901) and the boundary line 911 along the conveyance direction of the sheet 901.

As illustrated in FIG. 9, the overlap region 402 is split into a region 910a corresponding to the imaging unit 240a and a region 910b corresponding to the imaging unit 240b in a predetermined direction (width direction of the sheet). The boundary line 911 between the region 910a and the region 910b is set to be at a position with which the size, in the predetermined direction (the width direction of the sheet), of the region 910a is equal to or larger than the maximum value (equal to or larger than the maximum value 610a) of the conveyance misalignment of the sheet toward the side of the imaging unit 240a (left direction) and the size of the region 910b is equal to or larger than the maximum value (equal to or larger than the maximum value 610b) of the conveyance misalignment of the sheet toward the side of the imaging unit 240b (right direction). As illustrated in FIG. 9, the reference image 903a corresponding to the imaging unit 240a is configured to include a region corresponding to the region 910a. The reference image 903b corresponding to the imaging unit 240b is configured to include a region corresponding to the region 910b. Thus, even when the conveyance misalignment of the sheet occurs, the size of the read images 902a and 902b in the width direction can be maintained to be equal to or larger than those of the reference images 903a and 903b, whereby the size change processing for the read image in steps S203 and S216 in FIG. 10 described later can be implemented.

As in the first embodiment, the registration of the reference images 903a and 903b may be performed based on the read images obtained by reading the sheet 701 (without the conveyance misalignment) using the imaging units 240a and 240b. An image obtained by processing of superimposing or averaging two or more selected read images, may be registered as the reference image.

In the verification processing, the CPU 238 acquires the read images 902a and 902b by reading (capturing an image of) the sheet 901 being conveyed, by the imaging units 240a and 240b. Then, the CPU 238 compares the read images 902a and 902b respectively with the reference images 903a and 903b, stored in the memory 239, to perform verification on the image printed on the sheet.

<Processing Procedure>

Figure 10:
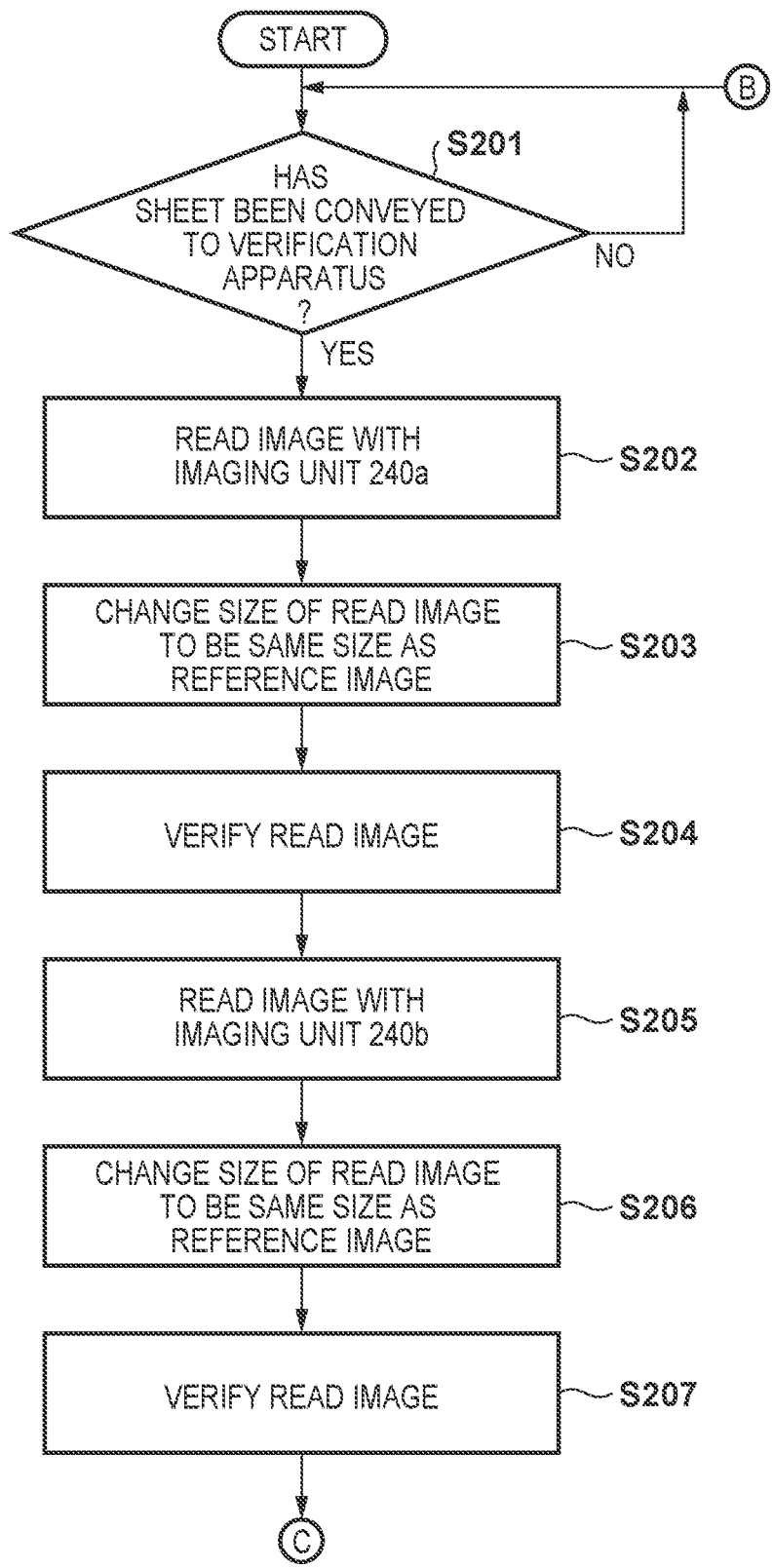
FIG. 10 is a flowchart illustrating a procedure of verification processing by the verification apparatus (second embodiment).

FIG. 10 and FIG. 8B are flowcharts illustrating a procedure of the verification processing by the verification apparatus 109 of the present embodiment. Processing in each step illustrated in the figures is implemented when the CPU 238 executes the control program stored in the memory 239.

When a print job starts to be executed in response to a user operation, the CPU 238 starts the processing of the procedure in FIG. 10 and FIG. 8B. First of all, upon determining that a sheet has been conveyed to the verification apparatus 109 in step S201, the CPU 238 advances the processing to step S202, as in step S101. In step S202, the CPU 238 controls the imaging unit 240a to capture an image of the conveyed sheet, to read an image printed on the sheet, as in step S102, and then advances the processing to step S203.

In the present embodiment, as described above, the size of the read image obtained by each of the imaging units 240a and 240b is equal to or larger than the size of the corresponding reference image. Thus, in step S203, the CPU 238 performs change processing of changing the size of the read image through processing similar to that in step S104. Specifically, the CPU 238 changes the size of the read image, by cropping the region of the same size as the reference image and excluding the remaining region (region on the right edge side), with the left edge of the read image being the reference point, in the width direction of the sheet. The CPU 238 stores the read image, after the size change, in the memory 239.

Then in step S204, the CPU 238 verifies the read image through processing similar to that in step S106, that is, by comparing the read image after the size change with the corresponding reference image, and stores the result of the verification in the memory 239. When the verification on the read image is completed, the CPU 238 advances the processing to step S205.

In steps S205 to S207, CPU 238 performs processing similar to those in steps S202 to S204, for the imaging unit 240b.

In S205, the CPU 238 controls the imaging unit 240b to capture an image of the conveyed sheet, to read an image printed on the sheet, as in step S107, and then advances the processing to step S206. In step S206, the CPU 238 performs change processing of changing the size of the read image through processing similar to that in step S109. Specifically, the CPU 238 changes the size of the read image, by cropping the region of the same size as the reference image and excluding the remaining region (region on the left edge side), with the right edge of the read image being the reference point, in the width direction of the sheet. The CPU 238 stores the read image, after the size change, in the memory 239.

As described above, in the present embodiment, the CPU 238 changes the sizes of the read images, obtained by reading an image on the sheet respectively by the imaging units 240a and 240b, to the equal size of the corresponding reference image in the predetermined direction (width direction).

Then in step S207, the CPU 238 verifies the read image through processing similar to that in step S111, that is, by comparing the read image after the size change with the corresponding reference image, and stores the result of the verification in the memory 239. When the verification on the read image is completed, the CPU 238 advances the processing to step S112 (FIG. 8B).

In steps S112 to S117, the CPU 238 performs processing that is similar to that in the first embodiment. When the output of all the pages has not been completed yet in step S117, the CPU 238 returns the processing to step S201 (FIG. 10), and performs the verification processing on the next sheet conveyed.

As described above, in the present embodiment, images with regions not overlapping with each other are used as the reference images corresponding to the imaging units 240a and 240b adjacent to each other. Thus, the region of the image that is the target of the verification in the verification processing can be reduced, whereby a load of the verification processing can be reduced. Furthermore, the size of the read image in the width direction can be maintained to be equal to or larger than that of the reference image, meaning that the processing of comparing the size of the read image and the size of the reference image is not required. Thus, the load of the verification processing can be reduced. Furthermore, the reference image can be downsized, whereby the memory capacity of the verification apparatus 109 required for storing the reference image can be reduced.

Other Embodiments

The embodiments described above are each merely an embodiment of the present invention, and the embodiments may be combined as appropriate.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s)

and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-018516, filed Feb. 8, 2021 which is hereby incorporated by reference herein in its entirety.

What is claimed is:

1. A verification apparatus configured to perform verification on an image printed on a sheet, the verification apparatus comprising:
   a reading unit including a plurality of imaging units configured to respectively perform reading in read regions different from each other in a predetermined direction orthogonal to a conveyance direction of a sheet, the reading unit being configured to use the plurality of imaging units to read the image on the sheet conveyed, the read regions respectively corresponding to adjacent imaging units partially overlapping with each other;
   a change unit configured to perform processing of changing a size, in the predetermined direction, of a larger one of a read image obtained by reading the image on the sheet by each of the plurality of imaging units, and a corresponding reference image, in accordance with a size of a smaller one; and
   a verification unit configured to perform verification by comparing the read image corresponding to each of the plurality of imaging units with the corresponding reference image, after the processing by the change unit has been completed.

2. The verification apparatus according to claim 1, wherein the plurality of imaging units are arranged such that a size, in the predetermined direction, of an overlap region where the corresponding read regions overlap, is equal to or larger than a maximum misalignment width in the predetermined direction in a case where conveyance misalignment of the sheet conveyed on a conveyance path occurs.

3. The verification apparatus according to claim 2, wherein the maximum misalignment width is determined based on relative positional relationship between the plurality of imaging units and the conveyance path, and a size, in the predetermined direction, of the sheet conveyed.

4. The verification apparatus according to claim 1 further comprising a storage unit configured to store images with regions of each image partially overlapping with each other, as reference images corresponding to the adjacent imaging units.

5. The verification apparatus according to claim 4, wherein the change unit is configured to:
   compare the size, in the predetermined direction, of the read image obtained by reading the image on the sheet by each of the plurality of imaging units with the size, in the predetermined direction, of the corresponding reference image;
   change the size, in the predetermined direction, of the read image to the equal size of the reference image when the size, in the predetermined direction, of the read image is larger than the size, in the predetermined direction, of the reference image; and
   change the size, in the predetermined direction, of the reference image to the equal size of the read image when the size, in the predetermined direction, of the reference image is larger than the size, in the predetermined direction, of the read image.

6. The verification apparatus according to claim 1 further comprising a storage unit configured to store images with regions of each image not overlapping with each other, as reference images corresponding to the adjacent imaging units.

7. The verification apparatus according to claim 6, wherein the change unit is configured to change the size, in the predetermined direction, of the read image obtained by reading the image on the sheet by each of the plurality of imaging units to the equal size, in the predetermined direction, of the corresponding reference image.

8. The verification apparatus according to claim 7, wherein
   the plurality of imaging units include a first imaging unit and a second imaging unit adjacent to each other, and read regions respectively corresponding to the first imaging unit and the second imaging unit partially overlap with each other in an overlap region,
   the overlap region is split, in the predetermined direction, into a first region corresponding to the first imaging unit and a second region corresponding to the second imaging unit, and a boundary line between the first region and the second region is set to be at a position, in the predetermined direction, with which a size of the first region is equal to or larger than a maximum value of conveyance misalignment of the sheet toward the side of the first imaging unit and a size of the second region is equal to or larger than a maximum value of conveyance misalignment of the sheet toward the side of the second imaging unit,
   the reference image corresponding to the first imaging unit includes a region corresponding to the first region, and
   the reference image corresponding to the second imaging unit includes a region corresponding to the second region.

9. The verification apparatus according to claim 1 further comprising a registration unit configured to register reference images respectively corresponding to the plurality of imaging units, based on an image read and obtained by the reading unit.

10. The verification apparatus according to claim 1 further comprising a registration unit configured to register reference images respectively corresponding to the plurality of imaging units, based on print data used for printing the image on the sheet conveyed.

11. The verification apparatus according to claim 1, wherein the verification unit is configured to determine whether the read images respectively corresponding to the plurality of imaging units are normal, determine the image printed on the sheet is normal in a case where all of the read images are normal, and determine that the image printed on the sheet is abnormal in a case where any of the read images is abnormal.

12. The verification apparatus according to claim 1 further comprising a control unit configured to perform discharge control to discharge, to respective different discharge destinations, a sheet determined to be normal and a sheet determined to be abnormal as a result of the verification by the verification unit.

13. A printing system comprising:
   a printing apparatus configured to print an image on a sheet; and
   the verification apparatus according to claim 1 to which the sheet having the image printed by the printing apparatus is conveyed through a conveyance path, the verification apparatus being configured to perform verification of the conveyed sheet.

14. A verification apparatus configured to perform verification on an image printed on a sheet, the verification apparatus comprising:
   a reading unit including a plurality of imaging units configured to respectively perform reading in read regions different from each other in a predetermined direction orthogonal to a conveyance direction of a sheet, the reading unit being configured to use the plurality of imaging units to read the image on the sheet conveyed, the read regions respectively corresponding to adjacent imaging units partially overlapping with each other;
   an identification unit configured to identify a size of one of a read image obtained by reading the image on the sheet by each of the plurality of imaging units, and a corresponding reference image, having a smaller size in the predetermined direction; and
   a verification unit configured to compare the read image corresponding to each of the plurality of imaging units and the corresponding reference image, about a region of the size identified by the identification unit in the predetermined direction, to verify the read image.

15. A method of controlling a verification apparatus configured to perform verification on an image printed on a sheet, the method comprising:
   using a plurality of imaging units to read an image on a sheet conveyed, the plurality of imaging units being configured to respectively perform reading in read regions different from each other in a predetermined direction orthogonal to a conveyance direction of the sheet, the read regions respectively corresponding to adjacent imaging units partially overlapping with each other;
   performing processing of changing a size, in the predetermined direction, of a larger one of a read image obtained by reading the image on the sheet by each of the plurality of imaging units, and a corresponding reference image, in accordance with a size of a smaller one; and
   performing verification by comparing the read image corresponding to each of the plurality of imaging units with the corresponding reference image, after the processing been completed.

16. A non-transitory computer-readable storage medium storing a computer program for causing a computer to execute a method of controlling a verification apparatus configured to perform verification on an image printed on a sheet, the method comprising:
   using a plurality of imaging units to read an image on a sheet conveyed, the plurality of imaging units being configured to respectively perform reading in read regions different from each other in a predetermined direction orthogonal to a conveyance direction of the sheet, the read regions respectively corresponding to adjacent imaging units partially overlapping with each other;
   performing processing of changing a size, in the predetermined direction, of a larger one of a read image obtained by reading the image on the sheet by each of the plurality of imaging units, and a corresponding reference image, in accordance with a size of a smaller one; and
   performing verification by comparing the read image corresponding to each of the plurality of imaging units with the corresponding reference image, after the processing been completed.

* * * * *